US012441230B2

(12) United States Patent
Strom et al.

(10) Patent No.: US 12,441,230 B2
(45) Date of Patent: Oct. 14, 2025

(54) METHOD AND APPARATUS FOR SECURING A VEHICLE

(71) Applicant: Nuro, Inc., Mountain View, CA (US)

(72) Inventors: Marcus Johan Strom, Phoenix, AZ (US); Jonathan Henry Dearing, Winnie, TX (US); Trevor Shuman, Houston, TX (US)

(73) Assignee: NURO, INC., Mountain View, CA (US)

( * ) Notice: Subject to any disclaimer, the term of this patent is extended or adjusted under 35 U.S.C. 154(b) by 717 days.

(21) Appl. No.: 17/835,808

(22) Filed: Jun. 8, 2022

(65) Prior Publication Data

US 2022/0396195 A1  Dec. 15, 2022

Related U.S. Application Data

(60) Provisional application No. 63/208,905, filed on Jun. 9, 2021.

(51) Int. Cl.
*B60P 7/00* (2006.01)
*B60P 3/12* (2006.01)
*B60P 7/08* (2006.01)
*B60P 7/15* (2006.01)

(52) U.S. Cl.
CPC .............. *B60P 7/08* (2013.01); *B60P 3/125* (2013.01); *B60P 7/15* (2013.01)

(58) Field of Classification Search
CPC ...... B60P 7/06; B60P 7/08; B60P 7/15; B60P 7/135; B60P 7/0807; B60P 7/0823; B60P 7/0892; B60P 3/06; B60P 3/07; B60P 3/075; B60P 3/077; B60P 3/1033; B60P 3/125; F16M 2200/06
USPC .............. 410/7, 8, 9, 10, 11, 18, 19, 30, 33; 248/298.1, 354.1; 211/18
See application file for complete search history.

(56) References Cited

U.S. PATENT DOCUMENTS 4,854,790 A * 8/1989 Andre ..................... B60P 3/075
                                                            410/30
9,376,063 B2 * 6/2016 Hein ......................... B60R 9/06

FOREIGN PATENT DOCUMENTS

EP          2139720 A1    1/2010

* cited by examiner

*Primary Examiner* — Steven O Douglas
(74) *Attorney, Agent, or Firm* — Edell, Shapiro & Finnan, LLC

(57) ABSTRACT

According to one aspect, a securement system configured to secure wheels of a vehicle against a surface, e.g., a surface on a transport vehicle, includes one or more locking mechanisms that are dynamically adjustable to engage the wheels. A locking mechanism may include mechanical structures such as prongs or fingers which are configured to apply forces to a wheel to effectively hold the wheel in place. The securement system may also include a bar arrangement which cooperates with the locking mechanisms to further constrain the movement of a vehicle that is secured to a surface using the securement system.

20 Claims, 17 Drawing Sheets

METHOD AND APPARATUS FOR SECURING A VEHICLE

CROSS-REFERENCE TO RELATED APPLICATIONS

This application claims priority to U.S. Provisional Application No. 63/208,905, filed on Jun. 9, 2021, and titled "Locking Mechanism." The content of the aforementioned priority document is hereby incorporated by reference in its entirety.

TECHNICAL FIELD

The disclosure relates to mechanical devices for securely transporting vehicles. More particularly, the disclosure relates to a securement system which enables the wheels of a vehicle to be secured to a transport mechanism.

BACKGROUND

The ability to lock vehicles to transport mechanisms enables the vehicles to be transported safely. For example, when a disabled vehicle or a vehicle that is otherwise unable to drive safely is loaded onto and transported on a flatbed truck, the disabled vehicle must be locked in place on the flatbed truck to prevent the disabled vehicle from becoming dislodged.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
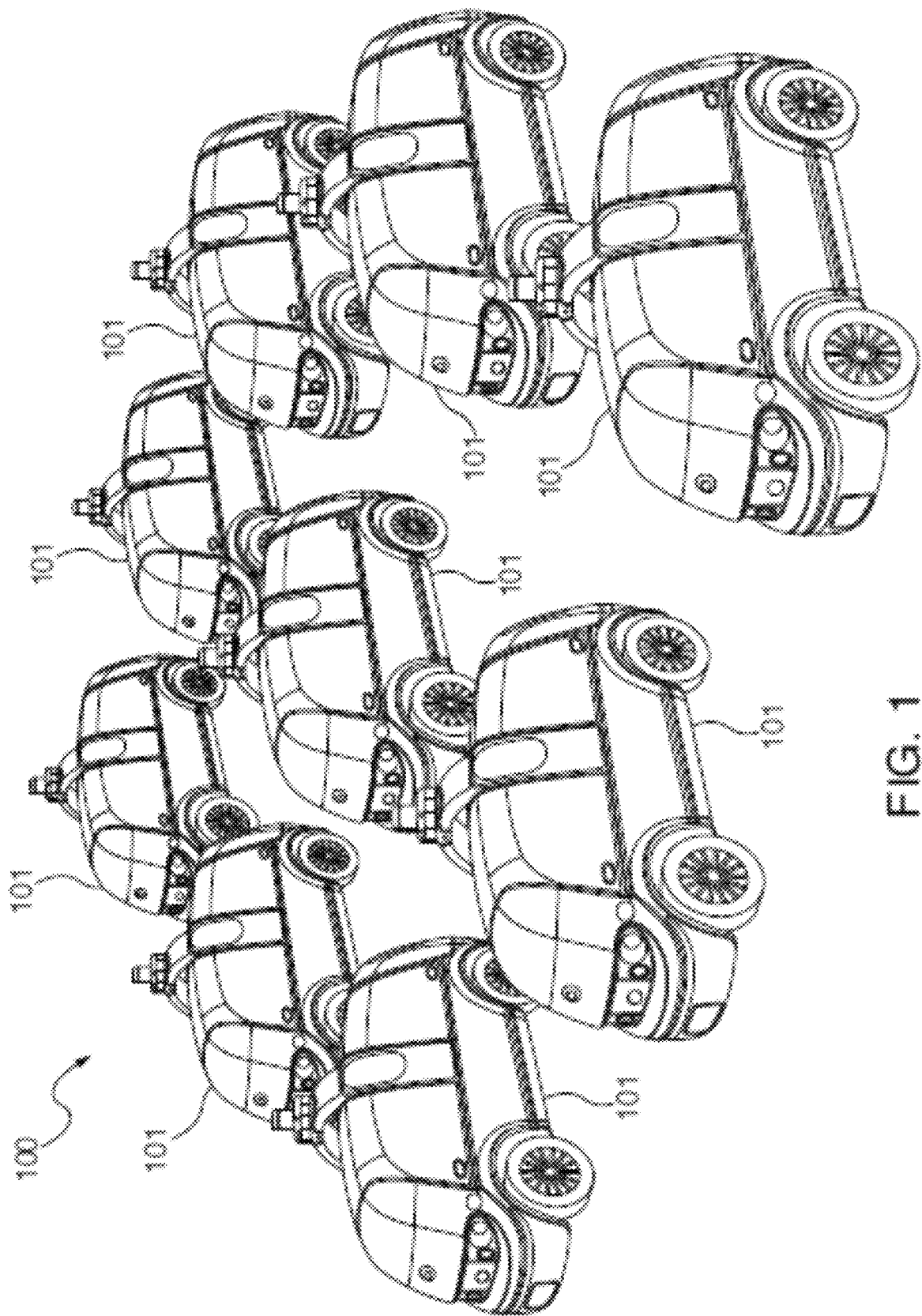
FIG. 1 is a diagrammatic representation of an autonomous vehicle fleet in accordance with an embodiment.

In one embodiment, a securement system configured to secure wheels of a vehicle against a surface, e.g., a surface on a transport vehicle, includes one or more locking mechanisms that are dynamically adjustable to engage the wheels. A locking mechanism may include mechanical structures such as prongs or fingers which are configured to apply forces to a wheel to effectively hold the wheel in place. The securement system may also include a bar arrangement which cooperates with the locking mechanisms to further constrain the movement of a vehicle that is secured to a surface using the securement system.

In another embodiment, a restraining apparatus for securing a wheel of a vehicle onto a surface, the restraining apparatus comprises an arm movable between a disengaged position and an engaged position, a first prong extending from the arm, a second prong extending from the arm, and wherein, when the arm is in the engaged position, a first prong and second prong are configurable to contact the wheel to secure the wheel onto the surface.

In another embodiment, a system for securing a vehicle onto a transport platform comprises a plurality of restraining mechanisms, each of the restraining mechanisms including an arm movable between a disengaged position and an engaged position, a first prong extending from the arm, a second prong extending from the arm, and wherein, when the arm is in the engaged position, a first prong and second prong are configurable to contact the wheel to secure the wheel onto the surface.

DESCRIPTION

As fleets of autonomous vehicles are deployed, there may be situations in which a deployed autonomous vehicle becomes disabled or is otherwise unable to drive in a particular environment. When an autonomous vehicle is disabled or unable to drive, a response or transport vehicle such as a tow truck or a flatbed truck may be deployed to retrieve the disabled vehicle. For example, when an autonomous delivery vehicle effectively becomes inoperable, an extraction vehicle may be deployed to the location of the autonomous delivery vehicle to transport the vehicle to a different location such as a location at which maintenance may be performed on the autonomous delivery vehicle.

Securing a disabled vehicle that is loaded onto an extraction vehicle is critical to ensure that the disabled vehicle remain substantially stationary with respect to the extraction vehicle. If the disabled vehicle or, more generally, a vehicle that is to be transported, is not securely locked or otherwise securely held against a surface of the extraction vehicle, damage to the disabled vehicle and/or the extraction vehicle may occur. In some situations, if the disabled vehicle is securely held on the extraction vehicle, the disabled vehicle may become separated from the extraction vehicle, and damage to road surfaces and/or road users may occur.

By engaging wheels or tires of a disabled vehicle with respect to a transport or extraction vehicle, the disabled vehicle may be held against a surface of the transport or extraction vehicle The disabled vehicle may be held such that a load associated with the vehicle does not significantly shift during normal operations of the transport or extraction vehicle, during acceleration of the transport or extraction vehicle, during braking of the transport or extraction vehicle, and/or during sharp maneuvering of the transport or extraction vehicle. Mechanisms used to engage the wheels may be adjustable to accommodate the size and location of the wheels, and may be configured to be readily adjusted. As a result, a vehicle may be efficiently and securely fastened to a transport surface of a transport or extraction vehicle.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment. The fleet management module may also dispatch transport or extraction vehicles (not shown) for purposes of removing any disabled autonomous vehicles 101 and transporting any disable autonomous vehicles 101 to an alternate location, e.g., a safe location such as a maintenance depot or garage.

Figure 2:
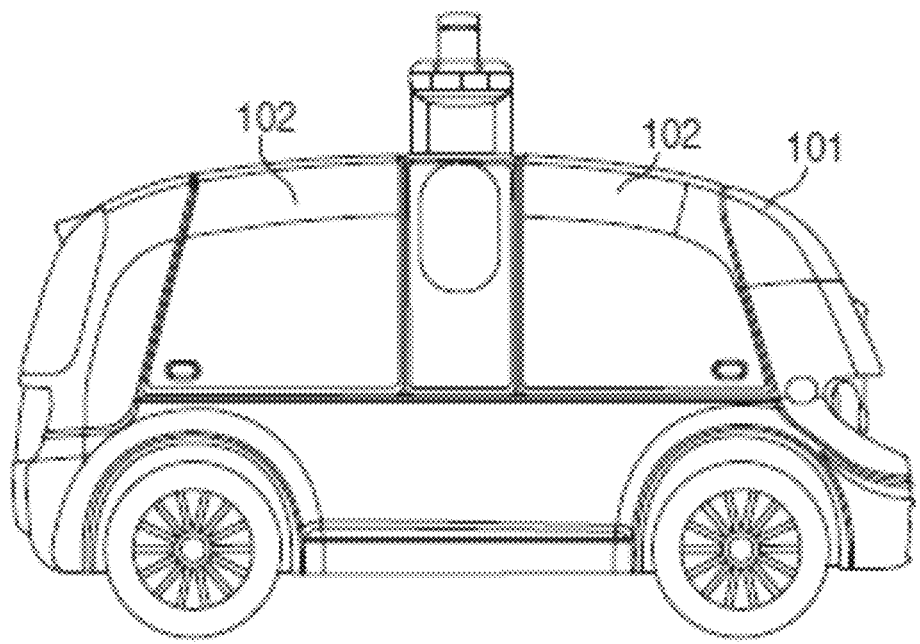
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
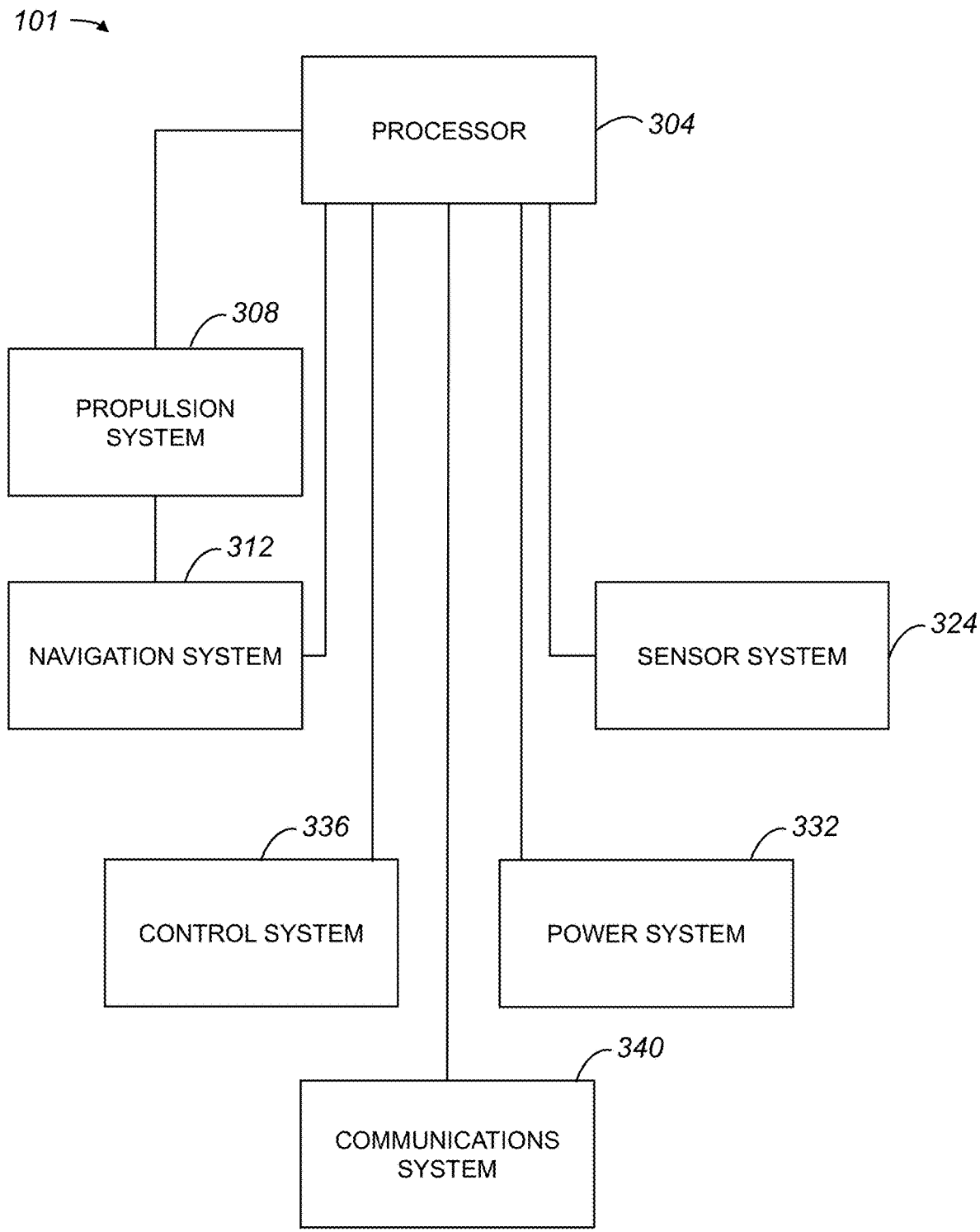
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

When autonomous vehicle 101, or any other autonomous or non-autonomous vehicle, becomes disabled or is otherwise unable to operate safely, a transport or extraction vehicle such as a tow truck or a flatbed truck may be dispatched to retrieve autonomous vehicle 101 from its current location. Once dispatched to the location of autonomous vehicle 101, the transport or extraction vehicle may load autonomous vehicle 101 onto a transport surface and proceed to transport autonomous vehicle 101 away from the location.

Figure 4:
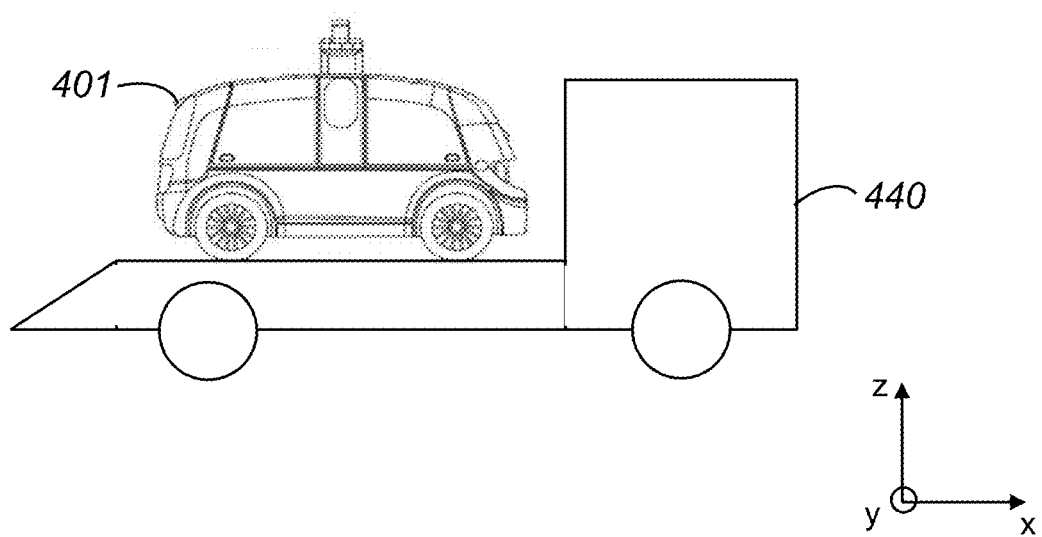
FIG. 4 is a diagrammatic side-view representation of a vehicle, e.g., an autonomous vehicle, that is transported on a transport or extraction vehicle in accordance with an embodiment.

FIG. 4 is a diagrammatic side-view representation of a vehicle, e.g., an autonomous vehicle, that is carried on and transported by a transport or extraction vehicle in accordance with an embodiment. A transport or extraction vehicle 440 is generally configured to carry a vehicle such as an autonomous vehicle 401. It should be appreciated that although autonomous vehicle 401 is shown, transport vehicle 440 may generally carry and transport any vehicle, autonomous or otherwise.

Methods used to effectively load vehicle 401 onto transport vehicle 440 may vary widely. Suitable methods may include, but are not limited to including, pushing or pulling vehicle 401 up a ramp associated with transport vehicle 440, and/or using a winch to lift vehicle 401. In one embodiment, vehicle 401 may be able to autonomously drive onto the transport vehicle 440, as for example when vehicle 440 is operational but unable to drive at the current location. Once vehicle 401 is loaded onto transport vehicle 440, transport vehicle 440 may travel to a location, e.g., a maintenance location, at which vehicle 401 may be unloaded from transport vehicle 440.

Typically, when vehicle 401 is loaded onto transport vehicle 440, vehicle 401 is substantially securely held on transport vehicle 440. In other words, when vehicle 401 is carried on transport vehicle 440, vehicle may effectively be locked into place to prevent vehicle 401 from moving relative to transport vehicle 440.

Figure 5A:
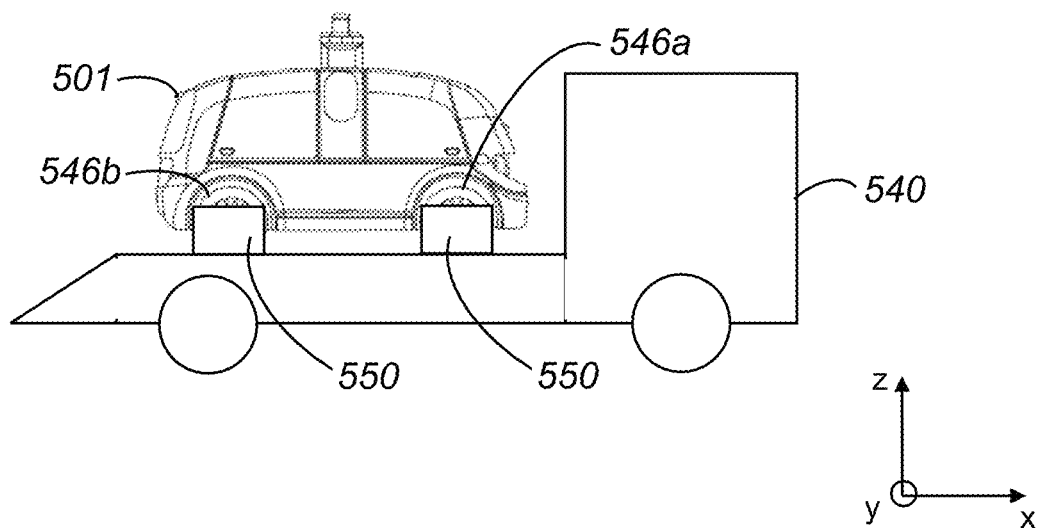
FIG. 5A is a diagrammatic side-view representation of a vehicle, e.g., an autonomous vehicle, that is transported on a transport or extraction vehicle which includes a securement system that includes locking mechanisms in accordance with an embodiment.
Figure 5B:
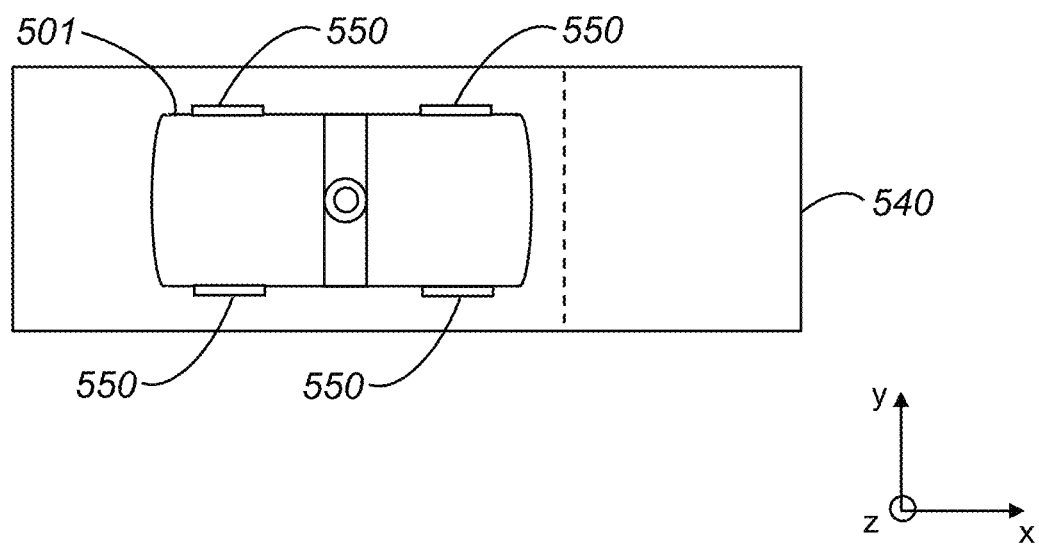
FIG. 5B is a diagrammatic top-view representation of a vehicle that is transported o on a transport or extraction vehicle which includes a securement system that includes locking mechanisms, e.g., vehicle 501 and transport vehicle 540 of FIG. 5A, in accordance with an embodiment.

With reference to FIGS. 5A and 5B, a securement system which includes a locking mechanism configured to secure a vehicle to a transport vehicle will be described in accordance with an embodiment. FIG. 5A is a diagrammatic side-view representation of a vehicle, e.g., an autonomous vehicle, that is transported on a transport or extraction vehicle which includes a securement system that includes locking mechanisms, and FIG. 5B is a diagrammatic top-view representation of such a vehicle. A transport vehicle 540 is configured to carry a vehicle 501, e.g., an autonomous vehicle. Vehicle 501 generally includes wheels or tires 546a, 546b. In the embodiment as shown, front tires 546a may be positioned closer to a front of transport vehicle 540, while rear tires 546b may be positioned closer to a rear of transport vehicle 540.

A securement system that is configured to engage tires 546a, 546b generally includes locking mechanisms 550. Each locking mechanism 550 is configured to effectively secure a tire 546a, 546b with respect to a surface of transport vehicle 540. In one embodiment, the securement system includes one locking mechanism 550 for each tire 546a, 546b. As indicated in FIGS. 5A, and 5B, vehicle 501 may include approximately four tires 546a, 546b, and the securement system may include approximately four locking mechanisms 550.

Figure 6:
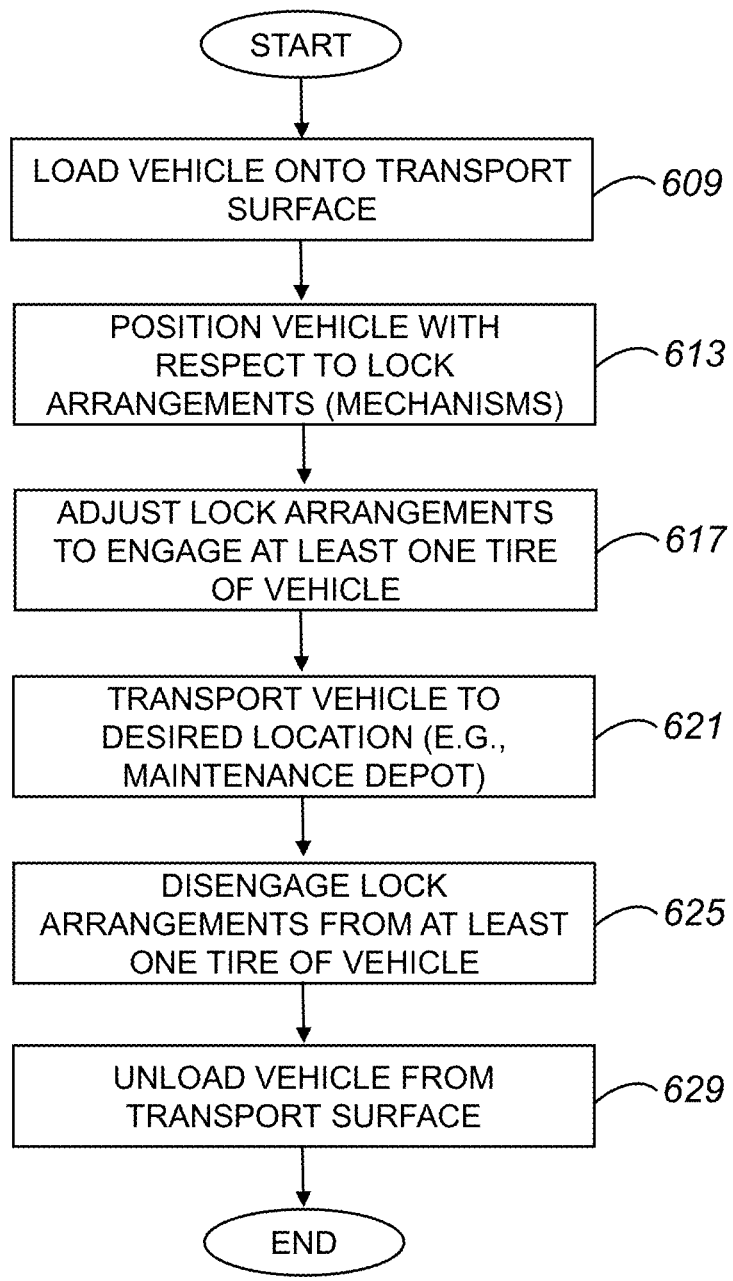
FIG. 6 is a process flow diagram which illustrates a method of transporting a vehicle to a desired location in accordance with an embodiment.

Referring next to FIG. 6, is a process flow diagram which illustrates a method of transporting a vehicle to a desired location in accordance with an embodiment. A method 605 of transporting a vehicle begins at a step 609 in which a vehicle, e.g., a vehicle that is disabled and/or may not be safely operated, is loaded onto a transport surface of a transport vehicle. The vehicle may be loaded onto the transport surface using any suitable method. In one embodiment, the transport surface is a surface of a flatbed truck or trailer.

In a step 613, the vehicle is positioned on the transport surface with respect to lock arrangements, e.g., lock mechanisms that are part of an overall securement system. Positioning the vehicle may include, but is not limited to including, adjusting the location of the vehicle on the transport surface such that the vehicle is substantially aligned with the lock arrangements. That is, vehicle may be located on the transport surface such that tires of the vehicle are essentially aligned with the lock arrangements.

Once the vehicle is positioned with respect to the lock arrangements, the lock arrangements are adjusted to enable each lock arrangement to engage a tire or wheel of the vehicle in a step 617. Adjusting the lock arrangements may include, but is not limited to including, varying the position of the lock arrangements with respect to the tire arrangements, configuring each lock arrangement to substantially engage or to otherwise hold a tire, substantially extending a portion of each lock arrangement, and/or effectively tightening each lock arrangement such that each lock arrangement may contact at least one portion of a tire.

The lock arrangements may be manually adjusted, as for example by a technician who is responsible or driving the transport vehicle. It should be appreciated, however, that the lock arrangements may instead be arranged to be substantially automatically adjusted.

After each lock arrangement is adjusted to engage at least one tire of the vehicle, the vehicle is transported to a desired location in a step 621. The desired location may be, but is not limited to being, a depot at which the vehicle is stored and at which maintenance may be performed on the vehicle.

In a step 625, the transport vehicle arrives at the desired location, and the lock arrangements are disengaged. Disengaging the lock arrangements may include, but is not limited to including, substantially retracting portions of the lock arrangements such that the lock arrangements are no longer in physical contact with the tires and/or moving the lock arrangements away from the tires.

Upon disengaging the lock arrangement, the vehicle is unloaded from the transport surface in a step 629. The process of transporting a vehicle is completed once the vehicle is unloaded from the transport surface.

Figure 7:
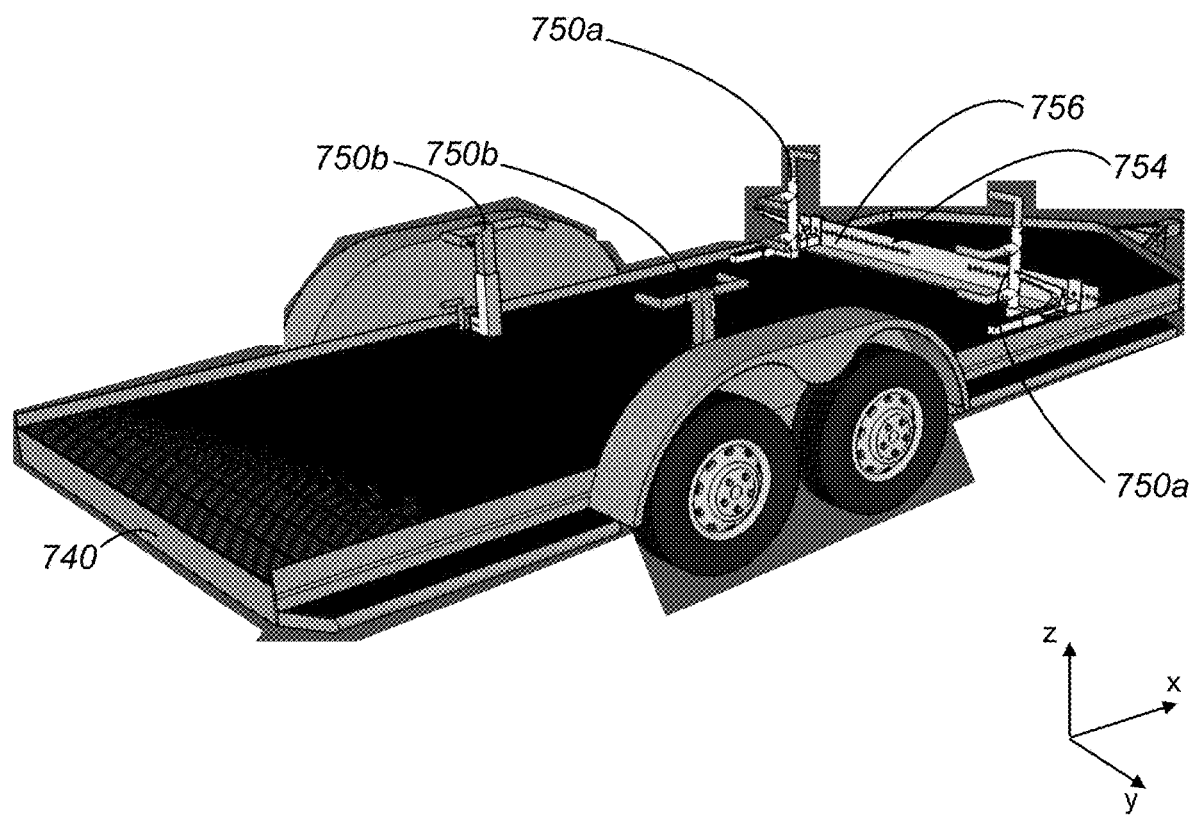
FIG. 7 is a diagrammatic representation of a transport vehicle on which locking mechanisms are included in accordance with an embodiment.

A securement system that includes locking mechanisms may be mounted, in one embodiment, substantially on a transport surface of a transport vehicle. A transport surface may be any surface that is arranged to carry a vehicle while the vehicle is being transported from one location to another. In general, a securement system may be mounted to a transport surface using any suitable method, e.g., using mechanical fasteners or couplings. FIG. 7 is a diagrammatic representation of a transport vehicle with a surface on which locking mechanisms are included in accordance with an embodiment. A transport vehicle 740, which may include a transport surface such as a flatbed or a trailer, is configured to support a vehicle (not shown) on the transport surface. Mounted on transport vehicle 740 is an overall securement system that includes first locking mechanisms 750a, second locking mechanisms 750b, and a bar arrangement 756. In one embodiment, first locking mechanisms 750a are arranged to engage a front tires of a vehicle (not shown) carried by transport vehicle 740, second locking mechanisms 750b are arranged to engage rear tires of the vehicle. An overall locking and positioning arrangement 754 includes bar arrangement 756 as well as first locking mechanisms 750a. Bar arrangement 756 is arranged to facilitate the positioning of the vehicle relative to first locking mechanisms 750a and second locking mechanisms 750b. Bar arrangement 756 may support first locking mechanisms 750a, and may also be configured as a positioning mechanisms which comes into contact with a vehicle (not shown) loaded on transport vehicle 740 to stop the vehicle in a particular position.

Figure 8:
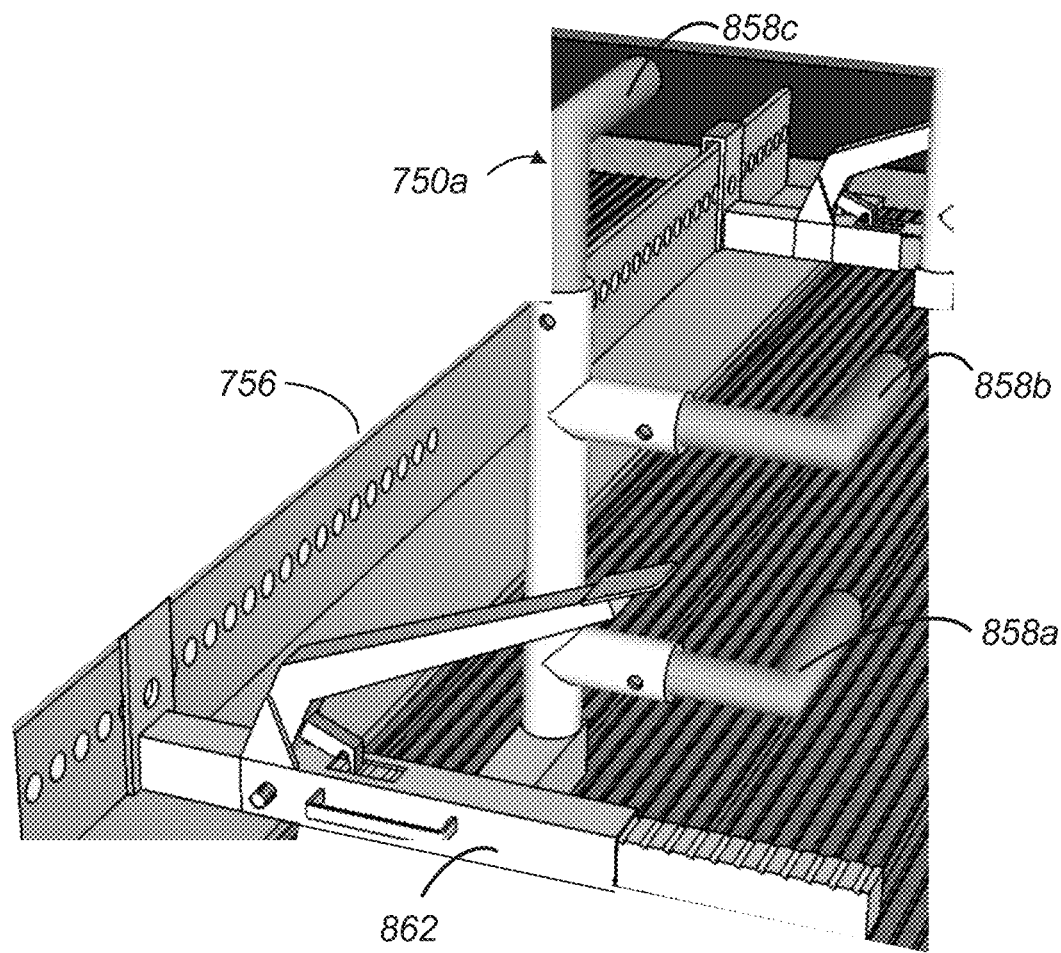
FIG. 8 is a diagrammatic representation of an overall locking and positioning arrangement, e.g., overall locking and positioning arrangement 754 of FIG. 7, in accordance with an embodiment.
Figure 8:
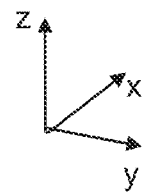

With reference to FIG. 8, overall locking and positioning arrangement 754 will be described in accordance with an embodiment. Locking and positioning arrangement 754, as discussed above, includes bar arrangement 756 and first locking mechanism 750a. First locking mechanism 750a may include an adjustment mechanism 862 that is configured to enable a position of first locking mechanism 756 to be moved relative to a y-axis. First locking mechanism 750a also includes prongs or fingers 858a-c which are configured to contact a wheel of a vehicle (not shown) to effectively prevent the wheel from significantly moving. In one embodiment, prongs 858a-c may be configured to effectively engage exterior surfaces of a wheel (not shown). Adjustment mechanism 862 may be arranged to enable prongs 858a-c to be moved to effectively lock or secure a tire (not shown), and to effectively unlock the tire. Adjustment mechanism 862 may be configured to lock into place when a desired position of prongs 858a-c is achieved. It should be appreciated that while prongs 858a-c are described, substantially any suitable mechanical structures or appendages may be implemented in lieu of prongs 858a-c.

The materials used to form overall locking and positioning arrangement 754 may vary widely. For example, first locking mechanism 750a may be formed from, but is not limited to be formed from, a metal allow such as billet aluminum. In general, prongs 858a-c may be formed from materials that may support a relatively high amount of shear loading. First locking mechanisms 750a and second locking mechanisms 750b of FIG. 7 may generally be formed from the same materials.

It should be appreciated that while first locking mechanism 750a may not be configured to be readily moved relative to an x-axis, the first locking mechanism 756a may be adjustable in some embodiments. That is, first locking mechanism 756a may be configured in some embodiments to be readily adjusted along the x-axis, the y-axis, and/or a z-axis. By way of example, first locking mechanism 750a may be configured in some embodiments to be adjustable along the x-axis such that first locking mechanism may be readily moved to different positions along bar arrangement 756.

Figure 9:
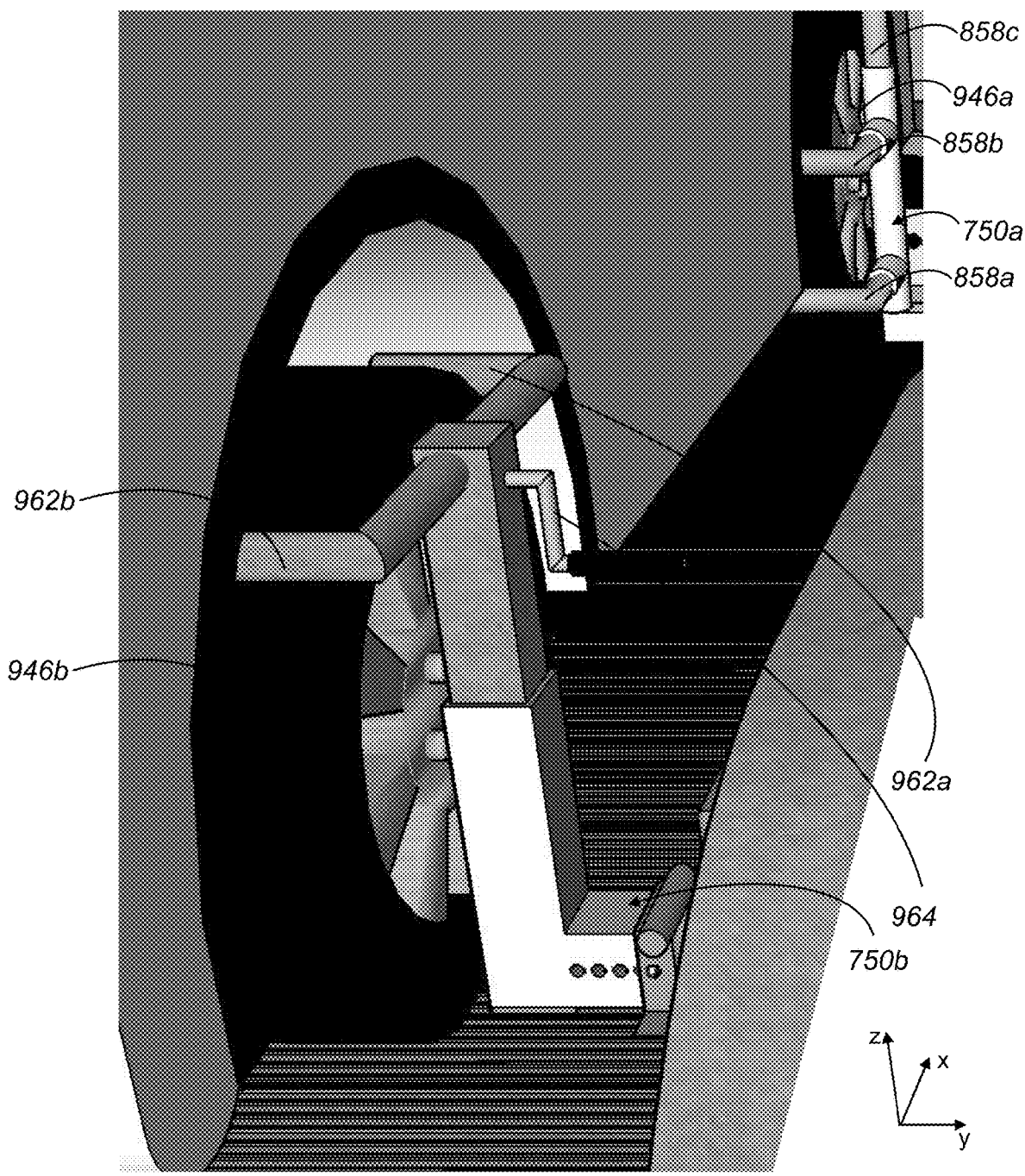
FIG. 9 is a diagrammatic representation of locking mechanisms, e.g., locking mechanisms 750*a*, 750*b* of FIG. 7, that are engaged with tires of a vehicle in accordance with an embodiment.

FIG. 9 is a diagrammatic representation of locking mechanisms 750a, 750b of FIG. 7, as shown with locking mechanisms 750a, 750b are engaged with tires of a vehicle in accordance with an embodiment. First locking mechanism 750a is configured such that prongs 858a-c contact a first tire 946a when first tire 946a is securely held. Second locking mechanism 750b includes prongs or fingers 962a, 962b which are adjusted to come into contact with a second tire 946b when second tire 946b is securely held. Second locking mechanism 750b includes, as shown, an adjustment mechanism 964 which may be used to adjust a position of prongs 962a, 962b and/or to lock prongs 962a, 962b in place at least along a one axis, e.g., a z-axis.

Figure 10A:
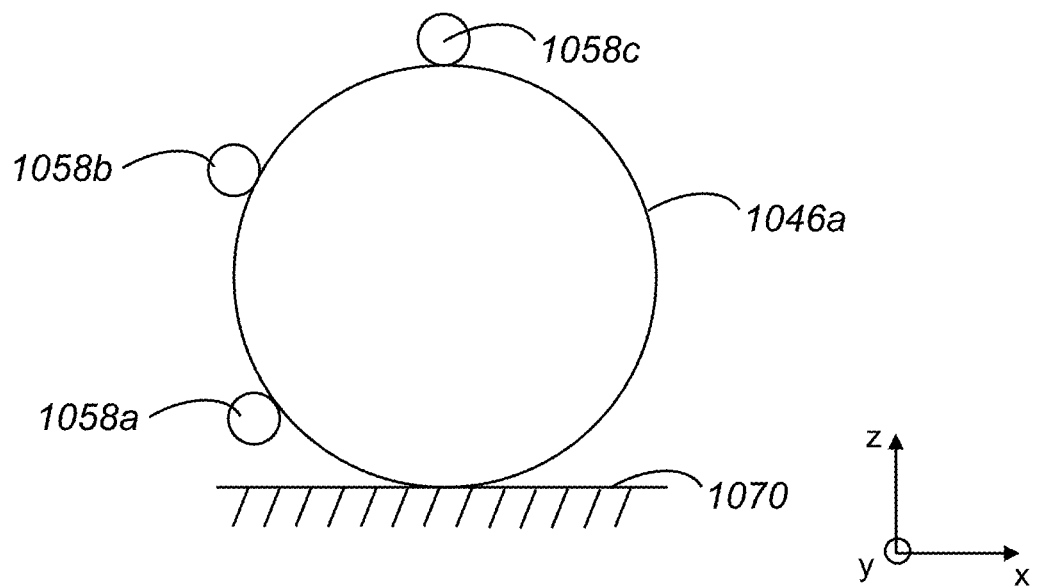
FIG. 10A is a block diagram representation of a wheel which is engaged with contact points of a first locking mechanism in accordance with an embodiment.

FIG. 10A is a block diagram representation of a wheel which is engaged with contact points of a first locking mechanism in accordance with an embodiment. A first locking mechanism includes prongs 1058a-c which are configured to engage a wheel 1046a when the first locking mechanism is effectively locked. Prongs 1058a-c or, more generally, mechanical structures may apply forces to wheel 1046a to effectively press wheel against a surface 1070. When the first locking mechanism is locked, prongs 1058a-c may prevent wheel 1046a from moving relative to an x-axis. It should be appreciated that a bar arrangement (not shown) may provide an extra constraint which may further constrain the movement of wheel 1046. That is, a bar arrangement such as bar arrangement 756 of FIG. 7 may further prevent wheel 1046a from moving when the prongs 1058a-c are engaged against wheel 1046a.

Figure 10B:
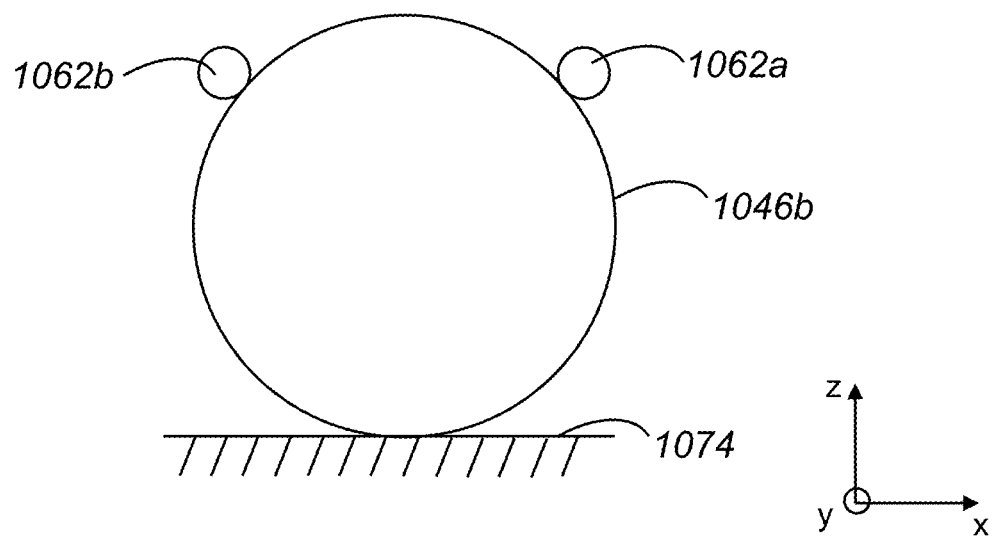
FIG. 10B is a block diagram representation of a wheel which is engaged with contact points of a second locking mechanism in accordance with an embodiment.

FIG. 10B is a block diagram representation of a wheel which is engaged with contact points of a second locking mechanism in accordance with an embodiment. A second locking mechanism includes prongs 1062a, 1062b which are configured to engage a wheel 1046b when the second locking mechanism is effectively locked. When the second locking mechanism is locked, prongs 1062a, 1062c may apply forces to wheel 1046b that effectively hold wheel against a surface 1072, and may prevent wheel 1046b from moving relative to an x-axis.

Figure 11A:
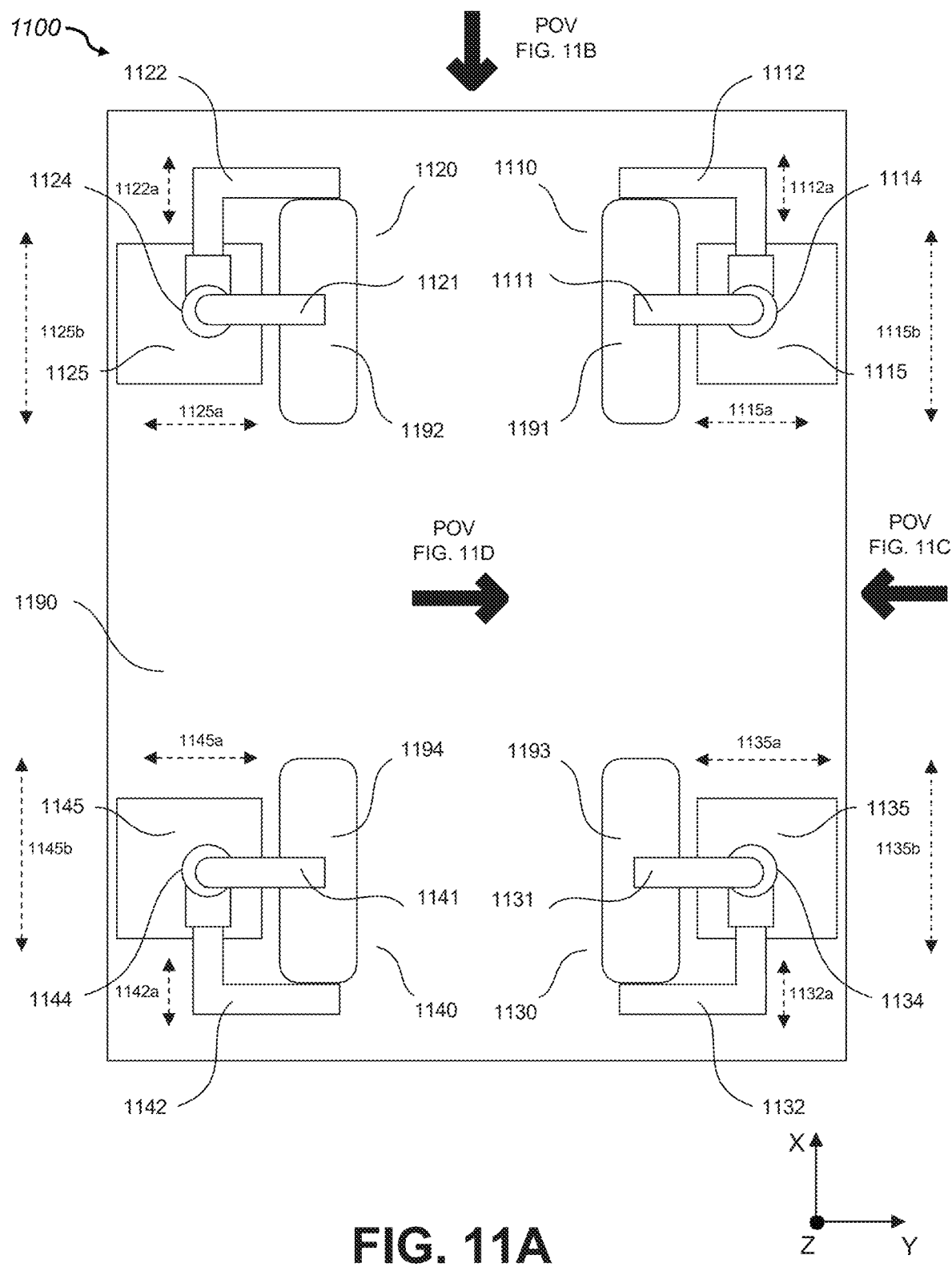
FIGS. 11A-11D illustrate various views of a restraining system configured to secure a vehicle onto or against a surface such as a trailer or a towing vehicle, in accordance with embodiments.
Figure 11B:
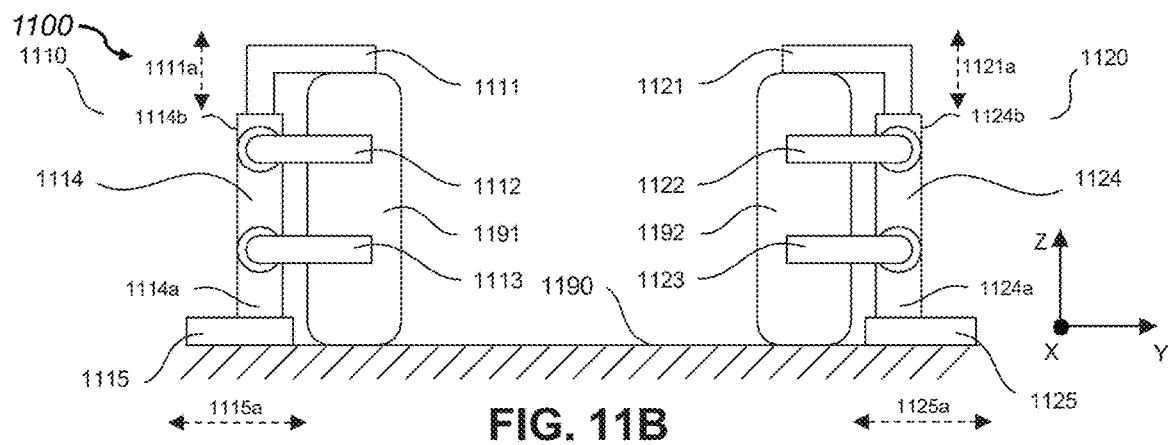
Figure 11C:
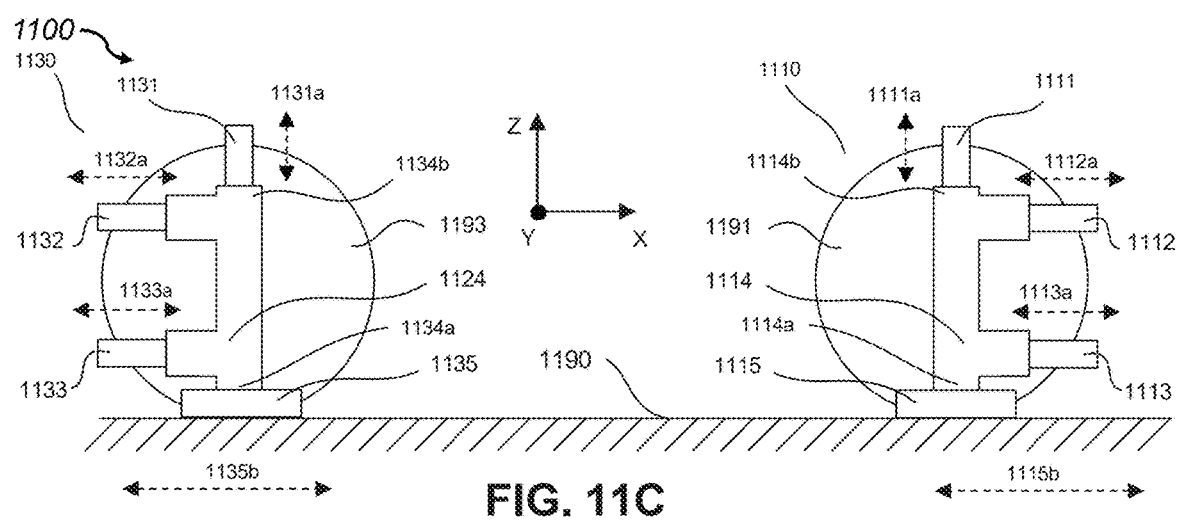
Figure 11D:
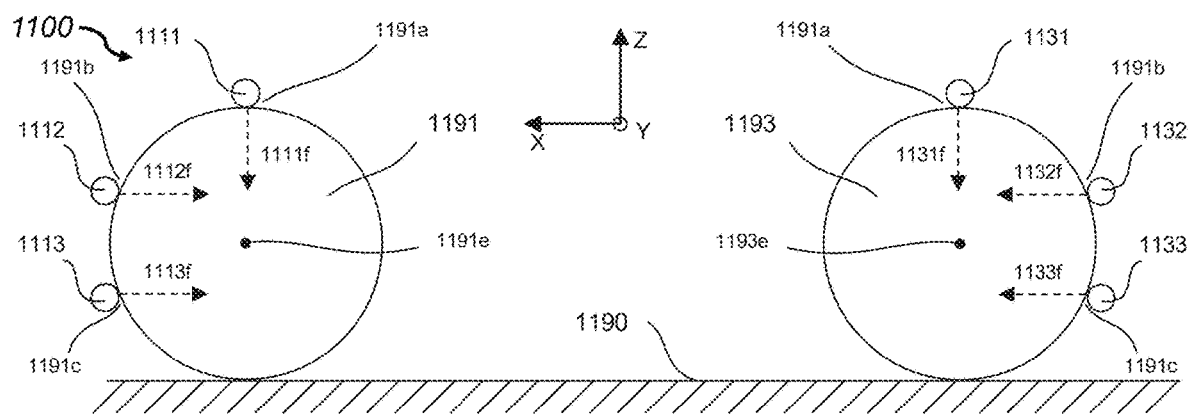

FIGS. 11A-11D illustrate various views of a restraining system configured to secure a vehicle onto or against a surface such as a trailer or a towing vehicle, in accordance with embodiments. In particular, FIG. 11A illustrates a top-down view of the restraining system, FIG. 11B illustrates a front view of the restraining system, FIG. 11C illustrates a side view of the restraining system, and FIG. 11D illustrates another side view of the restraining system. In FIGS. 11A through 11D, the restraining system is illustrated to be engaged or in contact with wheels and tires of a vehicle while the remainder of the vehicle is not depicted for illustrative purposes. FIG. 11A includes illustrations of the points of view (POVs) of FIGS. 11B-11D.

According to embodiments, the restraining system 1100, as shown in FIGS. 11A-11D, comprises a plurality of restraining or locking mechanisms 1110, 1120, 1130, and 1140. Each of the restraining mechanisms may be attached to the surface 1101 and may each be movable or reconfigurable between a disengaged position and an engaged position. FIGS. 12A-14D illustrate additional details regarding how embodiments of the restraining mechanisms may be moved or reconfigured between the disengaged and the engaged positions.

According to embodiments, each restraining mechanism 1110, 1120, 1130, and 1140 may be configurable to be engaged or in contact with a corresponding wheel (and tire) of the vehicle to be secured onto the surface 1190 (e.g., while in their respective engaged positions). As illustrated in FIGS. 11A-11D, restraining mechanism 1110 may be engaged or in contact with a first wheel 1191 of the vehicle; restraining mechanism 1120 may be engaged or in contact with a second wheel 1192 of the vehicle; restraining mechanism 1130 may be engaged or in contact with a third wheel 1193 of the vehicle; and restraining mechanism 1140 may be engaged or in contact with a fourth wheel 1194 of the vehicle. The restraining mechanisms 1110 and 1120 may be located in a forward direction of a trailer or towing vehicle on which the restraining mechanisms 1110, 1120, 1130, and 1140 are arranged while restraining mechanisms 1130 and 1140 may be located in an aft direction of the trailer or towing vehicle.

In certain embodiments, the restraining mechanisms 1110, 1120, 1130, and 1140 may be identical but may be respectively oriented depending on their respective locations on the surface of the trailer or towing vehicle. In other embodiments, the restraining mechanisms 1110, 1120, 1130, and 1140 may be constructed differently (e.g., FIG. 7). For instance, the forward restraining mechanisms 1110 and 1120 may be configured to be movable between their respective disengaged positions and engaged positions in a different manner as compared to the aft restraining mechanisms 1130 and 1140. The restraining system may be designed in this manner to, for example, accommodate space constraints of the trailer or towing vehicle. As another example, the forward restraining mechanisms each include three prongs while the aft restraining mechanisms may include only two prongs (e.g., FIG. 7).

According to embodiments, restraining or locking mechanism 1110 may be a forward (relative to the trailer or the towing vehicle) restraining or locking mechanism. Restraining mechanism 1110 may comprise a first prong 1111, a second prong 1112, a third prong 1113, an arm 1114, and a base 1115. The arm 1114 may be attached to the surface 1190 of the trailer or towing vehicle via the base 1115. And the arm 1114 may extend from a proximal end 1114a that is attached to the surface 1190 via the base 1115 to a distal end 1114b. At least when the arm is in the engaged position (e.g., as illustrated in FIGS. 11A-11D), the arm 1114 may extend in a first direction from the proximal end 1114a to the distal end 1114b, the first direction being perpendicular to the surface 1190 (e.g., in the Z-direction or in a vertical direction relative to the trailer, towing vehicle, or the vehicle being secured to the surface 1190). The first prong 1111, second prong 1112, third prong 1113 may all extend from the arm 1114. The first prong 1111 may extend from the distal end 1114b of the arm 1114 in the first direction (e.g., in the Z-direction) and may further extend in a second direction that is perpendicular to the first direction (e.g., in the Y-direction or in a direction that defines the width of the trailer, towing vehicle, or the vehicle being secured onto the surface 1190). In other words, the first prong 1111 may have a first component that extends in the Z-direction and a second component that extends in the Y-direction. The second prong 1112 extends in a third direction (e.g., in the X-axis or in the direction that defines the length of the trailer, towing vehicle, or the vehicle being secured to the surface 1190) that is perpendicular to the first and second directions and further extends in the second direction. In other words, the second prong 1112 may have a first component that extends in the X-direction and a second component that extends in the Y-direction. The third prong 1113 may be identically posed as the second prong 1112 and may extend in the third direction and may further extend in the second direction. The third prong 1113 may be located below the second prong 1112.

According to embodiments, restraining or locking mechanism 1120 may also be a forward (relative to the trailer or the towing vehicle) restraining or locking mechanism. The restraining mechanism 1120 may be arranged on the surface 1190 so as to mirror the pose of the other forward restraining mechanism 1110 with respect to the X-Z plane. Similar to restraining mechanism 1110, restraining mechanism 1120 may comprise a first prong 1121, a second prong 1122, a third prong 1123, an arm 1124, and a base 1125. The arm 1124 may be attached to the surface 1190 of the trailer or towing vehicle via the base 1125. And the arm 1124 may extend from a proximal end 1124a that is attached to the surface 1190 via the base 1125 to a distal end 1124b. At least when the arm is in the engaged position (e.g., as illustrated in FIGS. 11A-11D), the arm 1124 may extend in a first direction from the proximal end 1124a to the distal end 1124b, the first direction being perpendicular to the surface 1190 (e.g., in the Z-direction or in a vertical direction relative to the trailer, towing vehicle, or the vehicle being secured to the surface 1190). The first prong 1121, second prong 1122, third prong 1123 may all extend from the arm 1124. The first prong 1121 may extend from the distal end 1124b of the arm 1124 in the first direction (e.g., in the Z-direction) and may further extend in a second direction that is perpendicular to the first direction (e.g., in the Y-direction or in a direction that defines the width of the trailer, towing vehicle, or the vehicle being secured onto the surface 1190). In other words, the first prong 1121 may have a first component that extends in the Z-direction and a second component that extends in the Y-direction. The second prong 1122 extends in a third direction (e.g., in the X-axis or in the direction that defines the length of the trailer, towing vehicle, or the vehicle being secured to the surface 1190) that is perpendicular to the first and second directions and further extends in the second direction. In other words, the second prong 1122 may have a first component that extends in the X-direction and a second component that extends in the Y-direction. The third prong 1123 may be identically posed as the second prong 1122 and may extend in the third direction and may further extend in the second direction. The third prong 1123 may be located below the second prong 1122.

According to embodiments, restraining or locking mechanism 1130 may also be a forward (relative to the trailer or the towing vehicle) restraining or locking mechanism. The restraining mechanism 1130 may be arranged on the surface 1190 so as to mirror the pose of the other forward restraining mechanism 1110 with respect to the X-Z plane. Similar to restraining mechanism 1110, restraining mechanism 1130 may comprise a first prong 1131, a second prong 1132, a third prong 1133, an arm 1134, and a base 1135. The arm 1134 may be attached to the surface 1190 of the trailer or towing vehicle via the base 1135. And the arm 1134 may extend from a proximal end 1134a that is attached to the surface 1190 via the base 1135 to a distal end 1134b. At least when the arm is in the engaged position (e.g., as illustrated in FIGS. 11A-11D), the arm 1134 may extend in a first direction from the proximal end 1134a to the distal end 1134b, the first direction being perpendicular to the surface 1190 (e.g., in the Z-direction or in a vertical direction relative to the trailer, towing vehicle, or the vehicle being secured to the surface 1190). The first prong 1131, second prong 1132, third prong 1133 may all extend from the arm 1134. The first prong 1131 may extend from the distal end 1134b of the arm 1134 in the first direction (e.g., in the Z-direction) and may further extend in a second direction that is perpendicular to the first direction (e.g., in the Y-direction or in a direction that defines the width of the trailer, towing vehicle, or the vehicle being secured onto the surface 1190). In other words, the first prong 1131 may have a first component that extends in the Z-direction and a second component that extends in the Y-direction. The second prong 1132 extends in a third direction (e.g., in the X-axis or in the direction that defines the length of the trailer, towing vehicle, or the vehicle being secured to the surface 1190) that is perpendicular to the first and second directions and further extends in the second direction. In other words, the second prong 1132 may have a first component that extends in the X-direction and a second component that extends in the Y-direction. The third prong 1133 may be identically posed as the second prong 1132 and may extend in the third direction and may further extend in the second direction. The third prong 1133 may be located below the second prong 1132.

According to embodiments, restraining or locking mechanism 1140 may also be a forward (relative to the trailer or the towing vehicle) restraining or locking mechanism. The restraining mechanism 1140 may be arranged on the surface 1190 so as to mirror the pose of the other forward restraining mechanism 1110 with respect to the X-Z plane. Similar to restraining mechanism 1110, restraining mechanism 1140 may comprise a first prong 1141, a second prong 1142, a third prong 1143, an arm 1144, and a base 1145. The arm 1144 may be attached to the surface 1190 of the trailer or towing vehicle via the base 1145. And the arm 1144 may extend from a proximal end 1144a that is attached to the surface 1190 via the base 1145 to a distal end 1144b. At least when the arm is in the engaged position (e.g., as illustrated in FIGS. 11A-11D), the arm 1144 may extend in a first direction from the proximal end 1144a to the distal end 1144b, the first direction being perpendicular to the surface 1190 (e.g., in the Z-direction or in a vertical direction relative to the trailer, towing vehicle, or the vehicle being secured to the surface 1190). The first prong 1141, second prong 1142, third prong 1143 may all extend from the arm 1144. The first prong 1141 may extend from the distal end 1144b of the arm 1144 in the first direction (e.g., in the Z-direction) and may further extend in a second direction that is perpendicular to the first direction (e.g., in the Y-direction or in a direction that defines the width of the trailer, towing vehicle, or the vehicle being secured onto the surface 1190). In other words, the first prong 1141 may have a first component that extends in the Z-direction and a second component that extends in the Y-direction. The second prong 1142 extends in a third direction (e.g., in the X-axis or in the direction that defines the length of the trailer, towing vehicle, or the vehicle being secured to the surface 1190) that is perpendicular to the first and second directions and further extends in the second direction. In other words, the second prong 1142 may have a first component that extends in the X-direction and a second component that extends in the Y-direction. The third prong 1143 may be identically posed as the second prong 1142 and may extend in the third direction and may further extend in the second direction. The third prong 1143 may be located below the second prong 1142.

Referring to FIG. 11D, the first prong 1111 of the restraining mechanism 1110 may be configurable to be in contact with the wheel 1191 at a first location 1191a, the second prong 1112 of the restraining mechanism 1110 may be configurable to be in contact with the wheel 1191 at a second location 1191b, and the third prong 1113 of the restraining mechanism 1110 may be configurable to be in contact with the wheel 1191 at a third location 1191c. As illustrated in FIG. 11D, the first arm 1191 may be arranged above the wheel 1191 (e.g., in the Z or vertical direction) and may contact the wheel 1191 (e.g., at the first location 1191a) directly above or substantially above the center of the wheel 1191e. When in position, the first prong 1111 may be effectively pressed against the tire tread of the wheel 1191 at the first location 1191a and, in doing so, may effectively apply a static downward force 1111f on the wheel. The first prong 1111 may prevent the wheel 1191 (and thus the vehicle) from moving in a vertical direction (e.g., Z-direction) during transport on the trailer or towing vehicle. In addition, the prongs 1111, 1112, and 1113 may apply frictional forces on the wheel (and tire) 1191 to prevent the wheel 1191 from moving laterally (e.g., in the Y-direction). Similarly, the prongs 1131, 1132, and 1133 may apply frictional forces on the wheel (and tire) 1193 to prevent the wheel 1193 from moving laterally (e.g., in the Y-direction).

In addition, the second and third arms 1112 and 1113 may be arranged such that they contact the wheel at the second and third locations 1191b and 1191c that is offset vertically (e.g., in the Z-direction or the vertical direction) and horizontally (e.g., in the X-direction or the forward direction relative to the trailer or towing vehicle) from the center 1191e. In particular, the second location 1191b and third location 1191c may be substantially equally but oppositely offset from the center 1191e in the vertical (e.g., Z-axis) direction and may be substantially equally offset from the center 1191e in the forward (e.g., X-axis) direction. In other words, the second location 1191b may be offset above the center 1191e by the same amount as the third location 1191c is below the center 1191e. When in position, the second prong 1112 and third prong 1113 may be effectively pressed against the tire tread of the wheel 1191 at the second location 1191b and the third location 1191c, respectively. And, in doing so, the second prong 1112 and the third prong 1113 may effectively apply a static backward (e.g., relative to the trailer or towing vehicle) forces 1112f and 1113f on the wheel 1191. The second and third prongs 1112 and 1113 may prevent the wheel 1191 (and thus the vehicle) from moving in a forward direction (e.g., Z-direction) during transport on the trailer or towing vehicle.

Still referring to FIG. 11D, the first prong 1131 of the restraining mechanism 1130 may be configurable to be in contact with the wheel 1193 at a first location 1193a, the second prong 1132 of the restraining mechanism 1130 may be configurable to be in contact with the wheel 1193 at a second location 1193b, and the third prong 1133 of the restraining mechanism 1130 may be configurable to be in contact with the wheel 1193 at a third location 1193c. As illustrated in FIG. 11D, the first arm 1193 may be arranged above the wheel 1193 (e.g., in the Z or vertical direction) and may contact the wheel 1193 (e.g., at the first location 1193a) directly above or substantially above the center of the wheel 1193e. When in position, the first prong 1131 may be effectively pressed against the tire tread of the wheel 1193 at the first location 1193a and, in doing so, may effectively apply a static downward force 1131f on the wheel. The first prong 1131 may prevent the wheel 1193 (and thus the vehicle) from moving in a vertical direction (e.g., Z-direction) during transport on the trailer or towing vehicle.

In addition, the second and third arms 1132 and 1133 may be arranged such that they contact the wheel at the second and third locations 1193b and 1193c that is offset vertically (e.g., in the Z-direction or the vertical direction) and horizontally (e.g., in the X-direction or the forward direction relative to the trailer or towing vehicle) from the center 1193e. In particular, the second location 1193b and third location 1193c may be substantially equally but oppositely offset from the center 1193e in the vertical (e.g., Z-axis) direction and may be substantially equally offset from the center 1193e in the backward (e.g., X-axis) direction. In other words, the second location 1193b may be offset above the center 1193e by the same amount as the third location 1193c is below the center 1193e. When in position, the second prong 1132 and third prong 1133 may be effectively pressed against the tire tread of the wheel 1193 at the second location 1193b and the third location 1193c, respectively. And, in doing so, the second prong 1132 and the third prong 1133 may effectively apply a static forward (e.g., relative to the trailer or towing vehicle) forces 1132f and 1133f on the wheel 1193. The second and third prongs 1132 and 1133 may prevent the wheel 1193 (and thus the vehicle) from moving in a backward direction (e.g., Z-direction) during transport on the trailer or towing vehicle.

According to embodiments, the arms 1114, 1124, 1134, and 1144 of the restraining mechanisms 1110, 1120, 1130, and 1140 may each be moved between or may be reconfigurable between a disengaged position and an engaged position. In particular, the arms 1114, 1124, 1134, and 1144 may be moved or reconfigured into their respective disengaged position(s) to provide clearance for the vehicle to be moved into place on the surface 1190. After the vehicle is in place, 1114, 1124, 1134, and 1144 of the restraining mechanisms 1110, 1120, 1130, and 1140 may be moved or reconfigured into their respective engaged position(s) such that the wheels 1191, 1192, 1193, and 1194 of the vehicle may be secured onto the surface 1190. FIGS. 12A through 14C depict embodiments regarding the reconfiguration of the arms 1114, 1124, 1134, and 1144 between the disengaged and engaged positions.

In addition to the reconfiguration between the disengaged and engaged positions, the arms 1114, 1124, 1134, and 1144 of the restraining mechanisms 1110, 1120, 1130, and 1140 may be further adjustable in one or more directions. The arms 1114, 1124, 1134, and 1144 may be adjusted to enable the restraining mechanisms 1110, 1120, 1130, and 1140 to be in contact with the wheels 1191, 1192, 1193, and 1194 of the vehicle after the vehicle is moved into place on the surface 1190. In addition, the arms 1110, 1120, 1130, and 1140 may also be adjusted to accommodate varying vehicle types or wheel sizes. Referring to FIGS. 11A-11C, the arms 1114, 1124, 1134, and 1144 may each be adjusted in the X-direction (e.g., forwards and backwards relative to the trailer or towing vehicle) and/or the Y-direction (e.g., left and right relative to the trailer or towing vehicle). The adjustments may be made individually to each of the arms. As illustrated, the arm 1114 may be adjusted in the Y-direction 1115a and/or in the X-direction 1115b. In particular, the base 1115 of the restraining mechanism 1110 at which the arm 1114 attaches to the surface 1190 may enable the arm 1114 to be adjusted in accordance with 1115a and 1115b. Similarly, the arm 1124 may be adjusted as illustrated in accordance with 1125a and 1125b, the arm 1134 may be adjusted as illustrated in accordance with 1135a and 1135b, and the arm 1144 may be adjusted as illustrated in accordance with 1145a and 1145b.

According to embodiments, in addition to or as an alternative to the arms of the restraining mechanisms being adjustable, the prongs of the restraining mechanisms may be adjustable. In particular, the position of the first prong 1111 of the restraining mechanism 1110 may be adjusted vertically 1111a (e.g., in the Z-axis direction) and the positions of the second and third prongs 1112 and 1113 of the restraining mechanism 1110 may be adjusted in the forwards and backwards directions 1112a and 1113a (e.g., in the X-axis direction). The prongs 1111, 1112, and 1113 may be individually and separately adjustable or may be adjusted together using a shared adjustment mechanism (e.g., a hand crank). In some examples, the prongs 1112 and 1113 may be adjusted together (e.g., using a shared adjustment mechanism) while the prong 1111 maybe adjusted separately from the prongs 1112 and 1113. In certain implementations, one or more of the prongs may be fixed (e.g., not adjustable) while the other prong(s) may be adjustable. As an example, the second and third prongs 1112 and 1113 may be fixed while first prong 1111 may be adjustable. In such an example, the second and third prongs 1112 and 1113 may be brought into contact with the wheel 1191 by, for example, adjusting the arm 1114 in the X-direction. Thus, in certain examples, the prongs 1112 and 1113 may be fixed and the arm 1114 may be adjustable in the X-direction. And in other examples, the prong 1111 may be fixed and the arm 1114 may be adjustable in the Z-direction. Similarly, the arm 1114 may be fixed (e.g., not adjustable) in the X-direction and the prongs 1112 and 1113 may be adjustable in the X-direction. And in other examples, the prong 1111 may be fixed in the Z-direction and the prong 1111 may be adjustable in the Z-direction.

Similar to the restraining mechanism 1110, the first prong 1121 of the restraining mechanism 1120 may be adjusted in the Z-direction 1121a, the second prong 1122 may be adjusted in the X-direction 1122a, and the third prong 1123 may also be adjusted in the X-direction. And the first prong 1131 of the restraining mechanism 1130 may be adjusted in the Z-direction 1131a, the second prong 1132 may be adjusted in the X-direction 1132a, and the third prong 1133 may also be adjusted in the X-direction 1133a. Still further, the first prong 1141 of the restraining mechanism 1140 may be adjusted in the Z-direction, the second prong 1142 may be adjusted in the X-direction 1142a, and the third prong 1143 may also be adjusted in the X-direction.

Figure 12A:
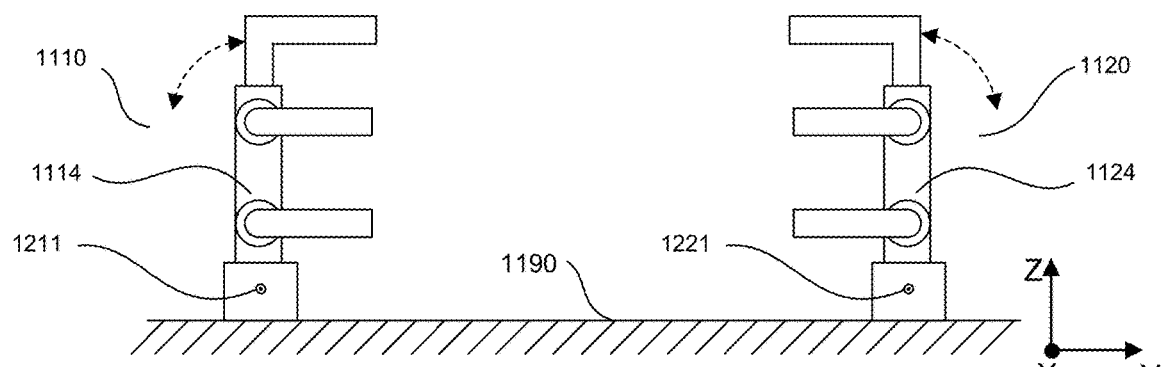
FIGS. 12A-12C illustrate an embodiment of a restraining system having restraining or locking mechanism that are reconfigurable between the disengaged and engaged positions, in accordance with embodiments.
Figure 12B:
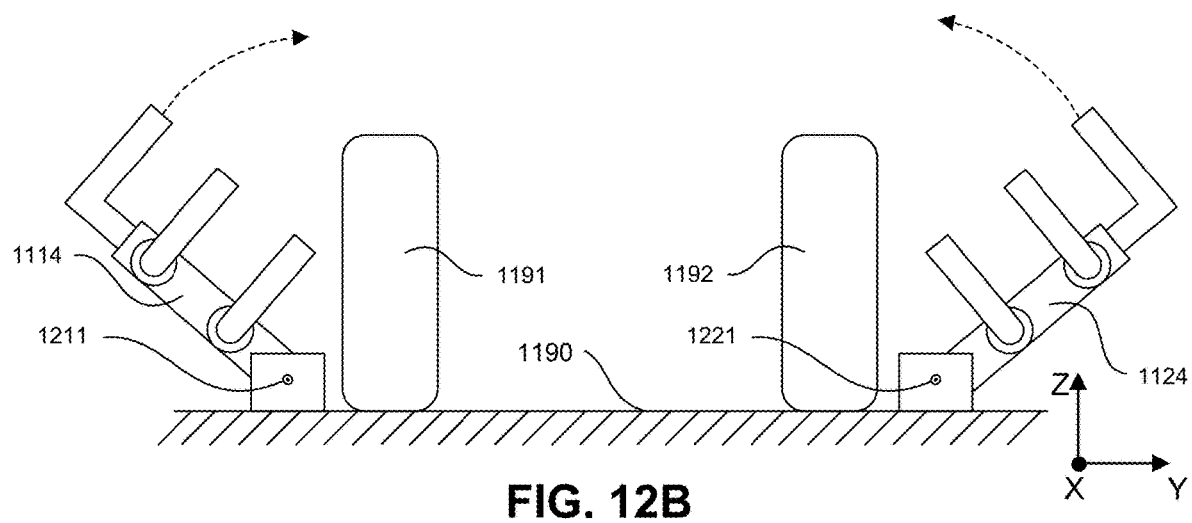
Figure 12C:
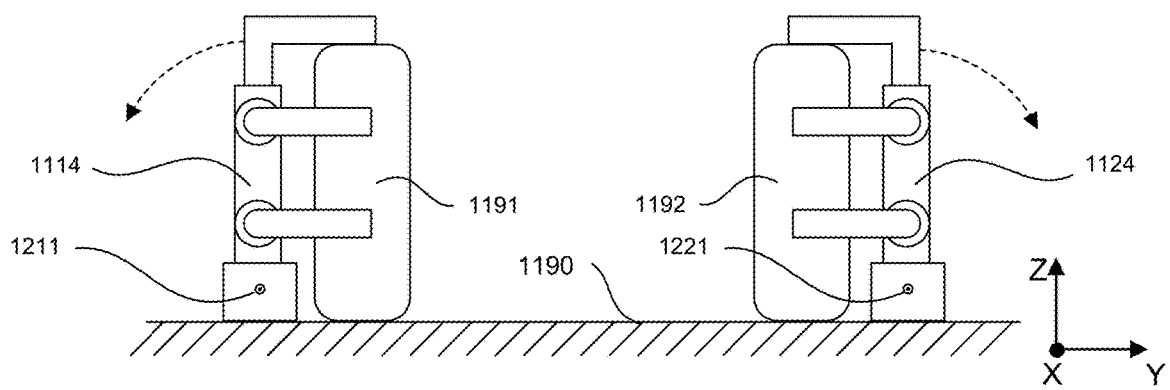
Figure 13A:
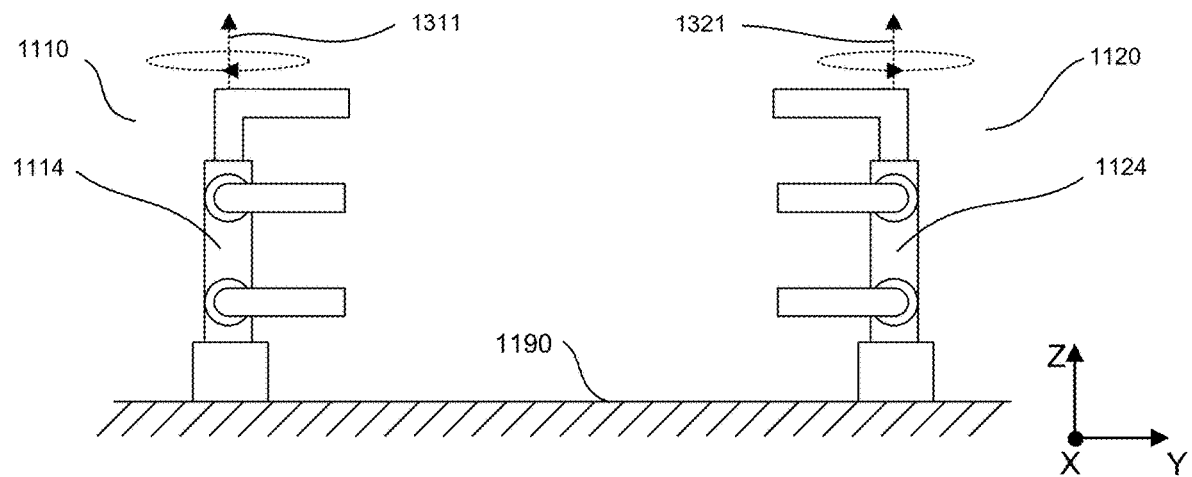
FIGS. 13A-13D illustrate another embodiment of a restraining system having restraining or locking mechanism that are reconfigurable between the disengaged and engaged positions, in accordance with embodiments.
Figure 13B:
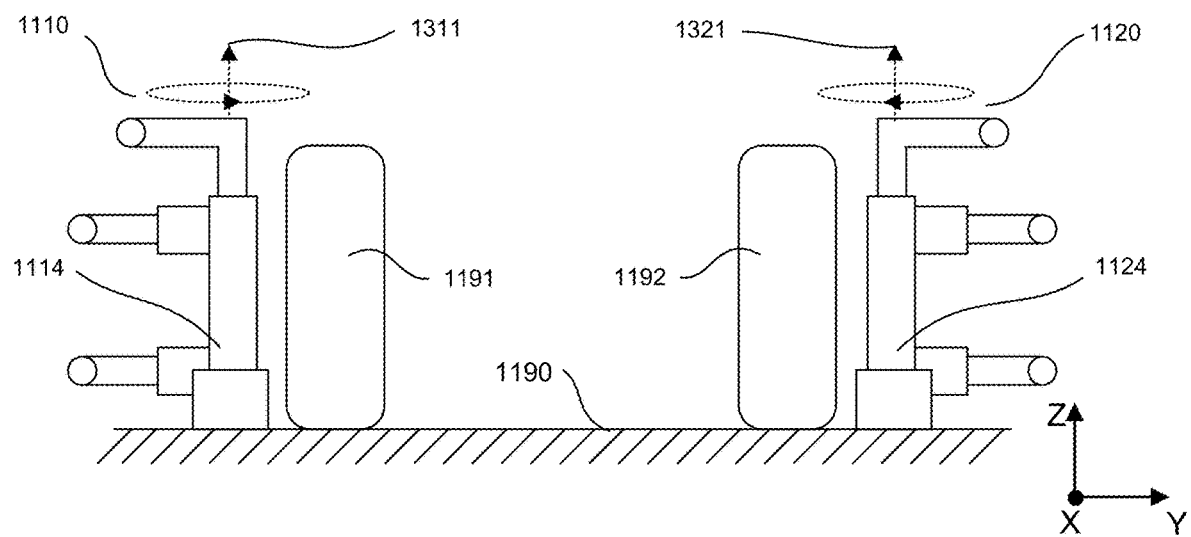
Figure 13C:
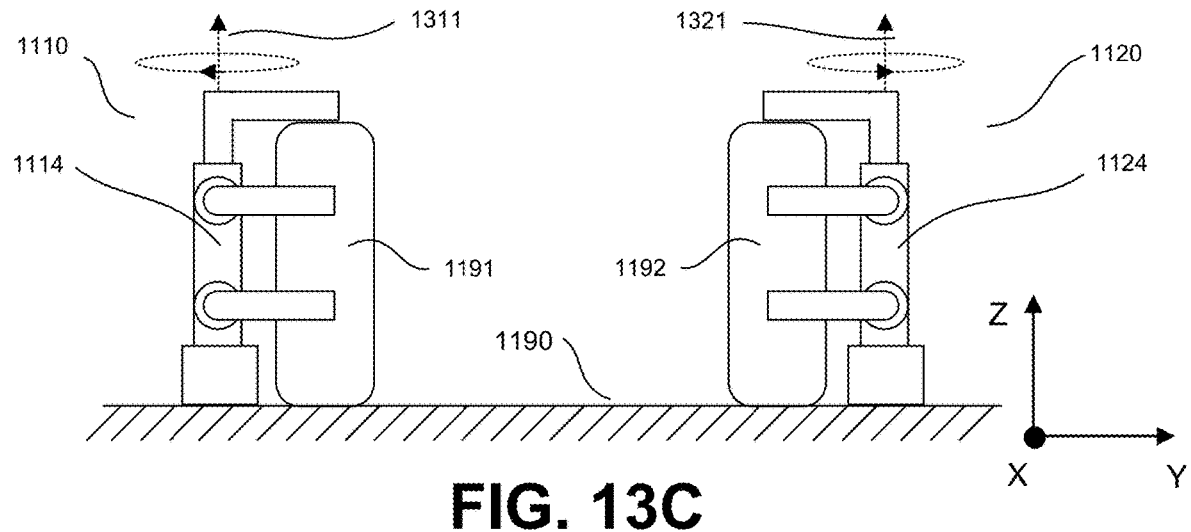
Figure 13D:
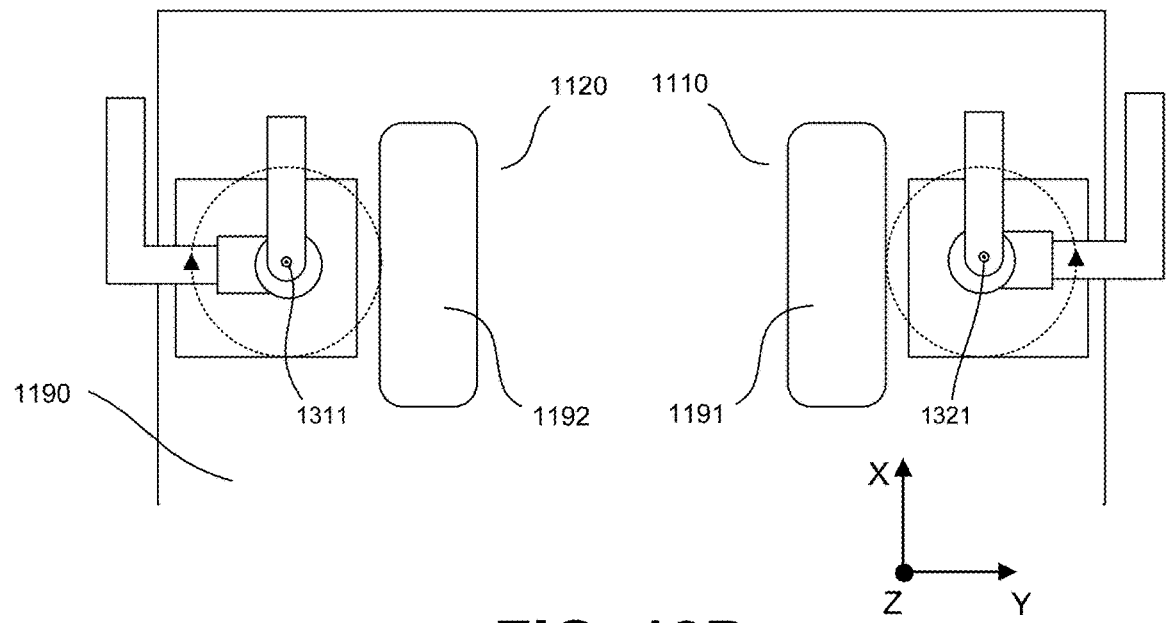
Figure 14A:
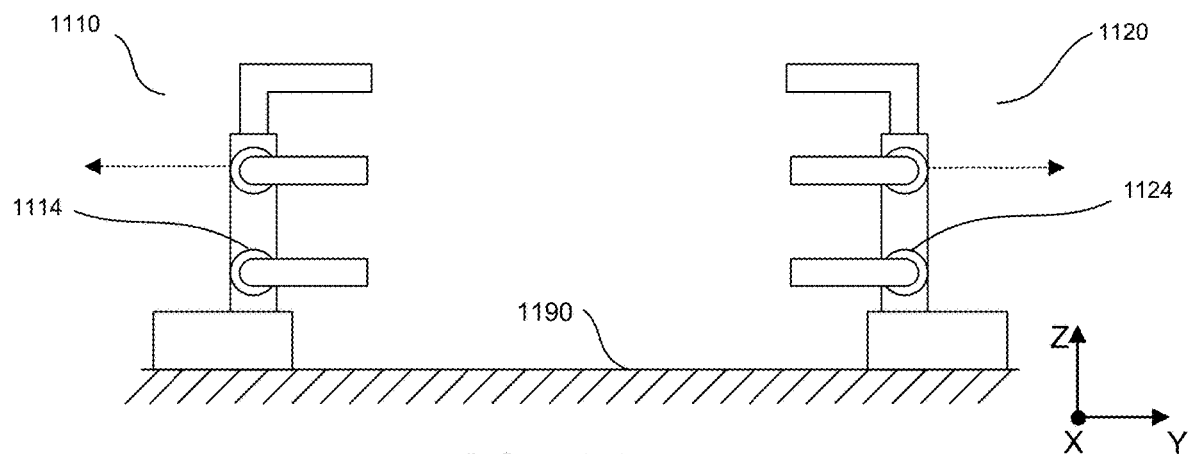
FIGS. 14A-14D illustrate yet another embodiment of a restraining system having restraining or locking mechanism that are reconfigurable between the disengaged and engaged positions, in accordance with embodiments.
Figure 14B:
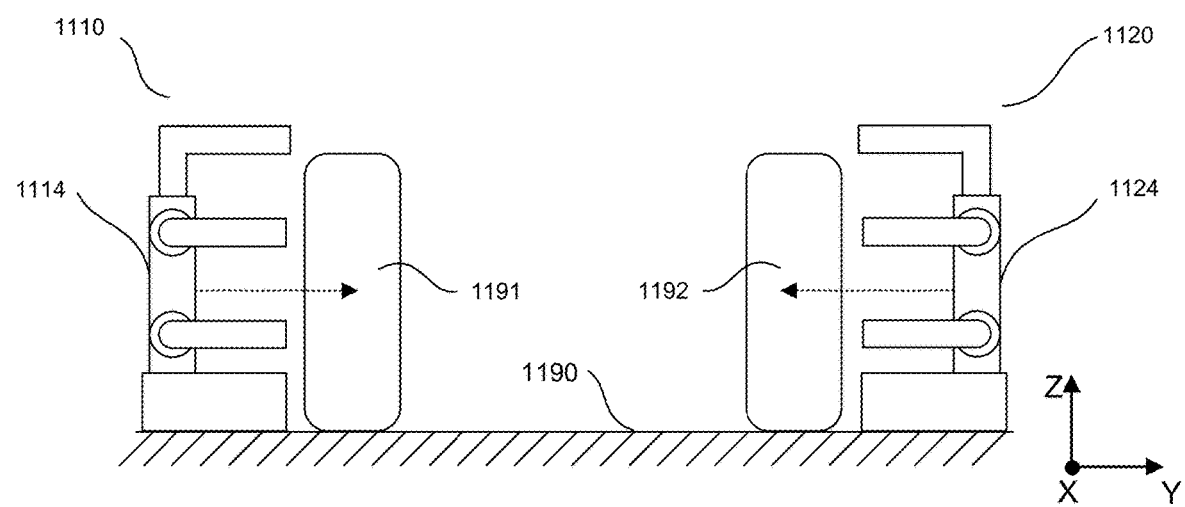
Figure 14C:
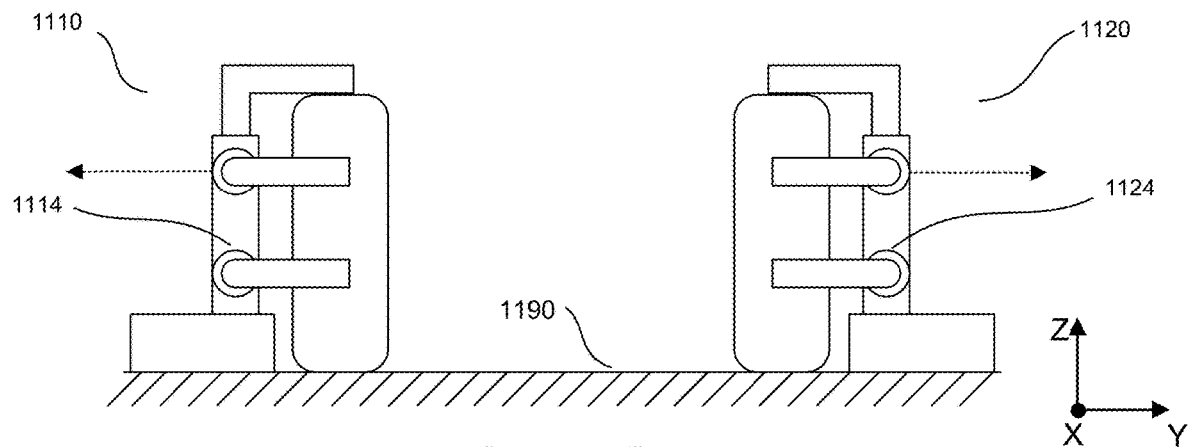

According to embodiments, the restraining mechanisms of the restraining system may be reconfigurable between engaged positions and disengaged positions to enable a vehicle to be positioned (e.g., driven or winched) onto the surface 1190 of the trailer or towing vehicle. In the below discussions of FIGS. 12A-14D, the restraining mechanisms of the restraining system may be configured into their respective engaged positions prior to the vehicle being loaded onto the surface 1190 of the trailer or towing vehicle (e.g., when the trailer or towing vehicle is traveling to the location of the vehicle). To load the vehicle onto the surface 1190 and enable the restraining mechanisms 1110, 1120, 1130, and 1140 to contact the wheels 1191, 1192, 1193, and 1194 of the vehicle to secure the vehicle onto the surface 1190, the arms of the restraining mechanisms 1110, 1120, 1130, and 1140 may each be reconfigured from their engaged positions (e.g., such as illustrated in FIGS. 12A, 13A, and 14A) to their disengaged positions (e.g., such as illustrated in FIGS. 12B, 13B, and 14B). While the arms 1114 and 1124 are in the disengaged positions, the vehicle may be driven or winched onto the surface 1190 into position. Once the vehicle is in position on the surface 1190, the restraining mechanisms 1110 and 1120 may be moved or reconfigured back into their engaged positions (e.g., such as illustrated in FIGS. 12C, 13C, and 14C). The restraining mechanisms 1110 and/or 1120 may be further adjusted such that the prongs of those restraining mechanisms are in contact with the wheels 1191 and 1192. For instance, the first prong 1111 of the restraining mechanism 1110 may be adjusted downward such that it presses against the wheel 1191. The arm 1114 and/or prongs 1112 and 1113 may also be adjusted backwards such that the prongs 1112 and 1113 press against the wheel 1191. To unload the vehicle, the arms of the restraining mechanisms 1110, 1120, 1130, and 1140 may each be reconfigured into their respective disengaged positions.

FIGS. 12A-12C illustrate an embodiment of a restraining system having restraining or locking mechanism that are reconfigurable between the disengaged and engaged positions, in accordance with embodiments. In particular, FIG. 12A illustrates a view of restraining mechanisms in the engaged position without a vehicle in place to be secured to the surface 1190, FIG. 12B illustrates a view of restraining mechanisms in the disengaged position and a vehicle (not depicted for illustrative purposes) in position to be secured onto the surface 1190, and FIG. 12C illustrates a view of restraining mechanisms in the engaged position and in contact with wheels 1191 and 1192 of the vehicle. Referring back to FIGS. 11A-11D, the restraining mechanisms illustrated in FIGS. 12A-12C may correspond to the restraining mechanisms such as 1110 and 1120 illustrated in and described with respect to FIGS. 11A-11D. In particular, the point of view depicted by FIGS. 12A-12C may correspond with the point of view depicted in FIG. 11B.

According to embodiments, the arm 1114 of the restraining mechanism 1110 may be moved or reconfigured between the disengaged and engaged positions by rotating around an axis of rotation 1211. As discussed herein, rotating an arm of a restraining mechanism may comprise pivoting, spinning, swiveling, and revolving the arm. The axis 1211 may correspond to the X-axis (e.g., the forward and backward directions relative to the trailer or the towing vehicle). Similarly, the arm 1124 restraining mechanism 1120 may be moved or reconfigured between the disengaged and engaged positions by pivoting or rotating around an axis of rotation 1221, which may also correspond to the X-axis. In particular, the arms 1114 and 1124 of the restraining mechanisms 1110 and 1120 may be rotated about their respective axes of rotation in opposite directions. For example, when viewed from the perspective of FIGS. 12A-12C (e.g., viewed from the front of the trailer or towing vehicle), the arm 1114 of restraining mechanism 1110 may be rotated in the clockwise direction around axis 1211 to reconfigure the arm 1114 (and the restraining mechanism 1110) from the disengaged position (e.g., FIGS. 12B) to the engaged position (e.g., FIG. 12C) and in the counterclockwise direction around axis 1211 to reconfigure the arm 1114 (and the restraining mechanism 1110) from the engaged position (e.g., FIG. 12C) to the disengaged position (e.g., FIG. 12B). In contrast, the arm 1124 of restraining mechanism 1120 may be rotated in the counterclockwise direction around axis 1221 to reconfigure the arm 1124 (and the restraining mechanism 1120) from the disengaged position (e.g., FIG. 12C) to the engaged position (e.g., FIG. 12C) and in the clockwise direction around axis 1221 to reconfigure the arm 1124 (and the restraining mechanism 1120) from the engaged position to the disengaged position. In some embodiments, the arms 1114 and 1124 may rotate or pivot by at least 65 degrees to reconfigure between the engaged and disengaged positions. In certain embodiments, the arms 1114 and 1124 may rotate or pivot by up to 90 degrees to reconfigure between the engaged and disengaged positions FIGS. 13A-13D illustrate another embodiment of a restraining system having restraining or locking mechanism that are reconfigurable between the disengaged and engaged positions, in accordance with embodiments. In particular, FIG. 13A illustrates a view of restraining mechanisms in the engaged position without a vehicle in place to be secured to the surface 1190, FIG. 13B illustrates a view of restraining mechanisms in the disengaged position and a vehicle (not depicted for illustrative purposes) in position to be secured onto the surface 1190, FIG. 13C illustrates a view of restraining mechanisms in the engaged position and in contact with wheels 1191 and 1192 of the vehicle, and FIG. 13D illustrates a view of the restraining mechanisms in disengaged positions. Referring back to FIGS. 11A-11D, the restraining mechanisms illustrated in FIGS. 13A-13D may correspond to the restraining mechanisms such as 1110 and 1120 illustrated in and described with respect to FIGS. 11A-11D. In particular, the point of view depicted by FIGS. 13A-13C may correspond with the point of view depicted in FIG. 11B and the point of view depicted by FIG. 13D may correspond with the point of view depicted in FIG. 11A.

According to embodiments, the arm 1114 of the restraining mechanism 1110 may be moved or reconfigured between the disengaged and engaged positions by pivoting or rotating around an axis of rotation 1311. The axis 1311 may correspond to the Z-axis (e.g., the vertical direction relative to the trailer or the towing vehicle). Similarly, the arm 1124 restraining mechanism 1120 may be moved or reconfigured between the disengaged and engaged positions by pivoting or rotating around an axis of rotation 1321, which may also correspond to the Z-axis. In particular, the arms 1114 and 1124 of the restraining mechanisms 1110 and 1120 may be rotated about their respective axes of rotation in opposite directions. For example, when viewed from the perspective of FIG. 13D (e.g., view from above the trailer or towing vehicle), the arm 1114 of restraining mechanism 1110 may be rotated in the clockwise direction around axis 1311 (e.g., by 90 degrees) to reconfigure the arm 1114 (and the restraining mechanism 1110) from the disengaged position (e.g., FIGS. 13B and 13D) to the engaged position (e.g., FIG. 13C) and in the counterclockwise direction around axis 1311 (e.g., by 90 degrees) to reconfigure the arm 1114 (and the restraining mechanism 1110) from the engaged position (e.g., FIG. 13C) to the disengaged position (e.g., FIGS. 13B and 13D). In contrast, the arm 1124 of restraining mechanism 1120 may be rotated in the counterclockwise direction around axis 1321 (e.g., by 90 degrees) to reconfigure the arm 1124 (and the restraining mechanism 1120) from the disengaged position (e.g., FIGS. 13B and 13D) to the engaged position (e.g., FIG. 13C) and in the clockwise direction around axis 1321 (e.g., by 90 degrees) to reconfigure the arm 1124 (and the restraining mechanism 1120) from the engaged position (e.g., FIGS. 13C) to the disengaged position (e.g., FIGS. 13B and 13D).

Figure 14D:
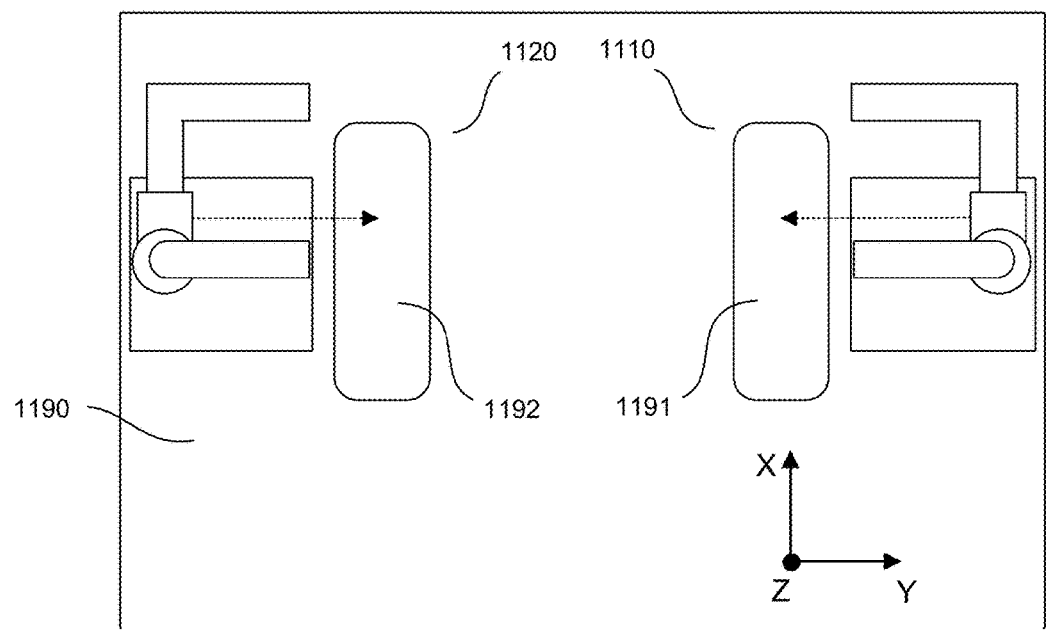

FIGS. 14A-14D illustrate yet another embodiment of a restraining system having restraining or locking mechanism that are reconfigurable between the disengaged and engaged positions, in accordance with embodiments. In particular, FIG. 14A illustrates a view of restraining mechanisms in the engaged position without a vehicle in place to be secured to the surface 1190, FIG. 14B illustrates a view of restraining mechanisms in the disengaged position and a vehicle (not depicted for illustrative purposes) in position to be secured onto the surface 1190, FIG. 14C illustrates a view of restraining mechanisms in the engaged position and in contact with wheels 1191 and 1192 of the vehicle, and FIG. 14D illustrates of a view of the restraining mechanisms in disengaged positions. Referring back to FIGS. 11A-11D, the restraining mechanisms illustrated in FIGS. 14A-14D may correspond to the restraining mechanisms such as 1110 and 1120 illustrated in and described with respect to FIGS. 11A-11D. In particular, the point of view depicted by FIGS. 14A-14C may correspond with the point of view depicted in FIG. 11B and the point of view depicted by FIG. 14D may correspond with the point of view depicted in FIG. 11A.

According to embodiments, the arms 1114 and 1124 may be moved or reconfigured between the disengaged and engaged positions by moving the arms 1114 and 1124 along the Y-axis (e.g., direction corresponding to the width of the trailer or towing vehicle). In particular this movement of the arms 1114 and 1124 in reconfiguring between the disengaged and engaged positions as depicted in FIGS. 14A-14D may correspond with the movements 1115a and 1125a illustrated in FIG. 11A. In particular, the arms 1114 and 1124 of the restraining mechanisms 1110 and 1120 may move in opposite directions along the Y-axis (e.g., outward in the direction of the width of the trailer or towing vehicle) into their respective disengaged positions to provide clearance for the vehicle to move onto the surface 1190 of the trailer or the towing vehicle. The arms 1114 and 1124 of the restraining mechanisms 1110 and 1120 may similarly move in opposite directions along the Y-axis (e.g., outward in the direction of the width of the trailer or towing vehicle) from their respective disengaged positions into their respective engaged positions.

As it may be appreciated, the restraining mechanisms 1110 and 1120 may be reconfigured between the engaged and disengaged positions in manners other than those illustrated in FIGS. 12A-14D. Moreover, the restraining mechanisms 1110 and 1120 may be reconfigured between the engaged and disengaged positions in a combination of manners illustrated in FIGS. 12A-14D. For example, the restraining mechanisms 1110 and 1120 may be reconfigured between their respective engaged and disengaged positions by both pivoting or rotating in the manner illustrated in FIGS. 12A-12C (e.g., around axes 1211 and 1221) and by moving in the manner illustrated in FIGS. 14A-14D (e.g., moving or sliding along the Y-axis). In such an embodiment, the angle of pivot or rotation of the arms of restraining mechanisms 1110 and 1120 may be reduced compared to the examples illustrated in FIGS. 12A-12C to provide clearance for the vehicle to be loaded onto and unloaded from the surface. For instance, in such embodiments, the angle of pivot or rotation of the arms may be less than 65 degrees. Furthermore, although not illustrated in FIGS. 12A-14D, the restraining mechanisms 1130 and 1140 (e.g., the aft restraining mechanisms) may be moved or reconfigured between the disengaged and engaged positions in the same or similar manners as any of those depicted and described for the restraining mechanisms 1130 and 1140 in FIGS. 12A-14D.

Although only a few embodiments have been described in this disclosure, it should be understood that the disclosure may be embodied in many other specific forms without departing from the spirit or the scope of the present disclosure. By way of example, a securement system has been described as including locking mechanisms which are mounted on a transport surface. The locking mechanisms are not limited to being mounted on a transport surface. For instance, the locking mechanisms may be mounted on different surfaces such that each locking mechanism has a substantially separate surface on which the locking mechanism is mounted.

The number of locking mechanisms used to secure a vehicle for transport purposes may vary. While the use of one locking mechanism per tire or wheel has generally been described, the number of locking mechanisms is not limited to one per tire. For example, some tires may not be engaged by a locking mechanism, and some tires may be engaged by more than one locking mechanism.

As discussed above, a vehicle that is loaded on a transport vehicle for transport to a different location may generally be disabled, effectively inoperable, or unable to operate safely. A vehicle may be considered to be disabled or effectively inoperable if the vehicle is not designed or is not authorized to operate under particular conditions, e.g., a vehicle may not be able to meet speed limit requirements of a particular road. When a vehicle is unable to meet speed limit requirements of a particular road, the vehicle may be transported by a transport vehicle to a different road on which the vehicle may operate. That is, a vehicle that is transported on a transport vehicle may be operational but unable to safely and/or operate under particular conditions.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

In one embodiment, a securement system that includes locking mechanisms is may be incorporated onto a transport vehicle. A transport vehicle may include a surface such as a flatbed surface on which a vehicle such as an autonomous vehicle may be loaded for transport, as described above. The surface may be a surface of a trailer configured to be towed while carrying a vehicle. It should be understood that the configuration of such a trailer may vary widely. For instance, such a trailer may include, but is not limited to including, a stop bar that may flip up to constrain the movement of at least one tire of a vehicle carried on the trailer once the vehicle is determined to be in a desired position. Such a trailer may also include a ramp which facilitates the disengaged of a vehicle onto the trailer, and the ramp may be arranged to be folded when not in use. In order to compensate for the weight of the ramp, the ramp may be spring-assisted.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A restraining apparatus for securing a wheel of a vehicle onto a surface, the restraining apparatus comprising:
    an arm movable between a disengaged position and an engaged position, wherein the arm extends in a first direction from a proximal end of the arm to a distal end of the arm, the proximal end of the arm being attached to the surface;
    a first prong extending from the arm;
    a second prong extending from the arm; and
    wherein, when the arm is in the engaged position, the first prong and the second prong are configurable to secure the wheel onto the surface, and wherein the first prong extends in the first direction from the distal end of the arm and further extends in a second direction that is perpendicular to the first direction, and the second prong extends in a third direction that is perpendicular to both the first direction and the second direction and further extends in the second direction that is perpendicular to the first direction.

2. The restraining apparatus of claim 1, wherein, at least when the arm is in the engaged position, the first direction in which the arm extends corresponds with a vertical direction that is perpendicular to the surface.

3. The restraining apparatus of claim 1, wherein the first prong is adjustable in the first direction.

4. The restraining apparatus of claim 1, further comprising:
    a third prong arranged on the arm, the third prong being configurable to contact the wheel to apply a second horizontal force on the wheel; and
    wherein the third prong extends in the second direction and further extends in the third direction.

5. The restraining apparatus of claim 4, wherein the second prong and the third prong are adjustable in the third direction.

6. The restraining apparatus of claim 1, wherein the first prong is configurable to contact the wheel to apply a downward force on the wheel and the second prong is configurable to contact the wheel to apply a horizontal force on the wheel.

7. The restraining apparatus of claim 1, wherein the first prong is configurable to contact the wheel at a first location on a tire tread of the wheel and the second prong is configurable to contact the wheel at a second location on the tire tread of the wheel.

8. The restraining apparatus of claim 1, wherein the arm is movable between the disengaged position and the engaged position by rotating around an axis that is perpendicular to the first direction.

9. The restraining apparatus of claim 1, wherein the arm is movable between the disengaged position and the engaged position by rotating around an axis that is aligned with the first direction.

10. The restraining apparatus of claim 1, wherein the arm is movable between the disengaged position and the engaged position by moving in a direction that corresponds to a width of the vehicle.

11. The restraining apparatus of claim 1, further comprising an arm adjustment mechanism for moving the arm between the disengaged position and the engaged position.

12. The restraining apparatus of claim 1, further comprising a prong adjustment mechanism for adjusting a position of the first prong or a position of the second prong.

13. The restraining apparatus of claim 1, further comprising a prong adjustment mechanism for adjusting respective positions of the first prong and the second prong.

14. The restraining apparatus of claim 1, wherein the first prong is adjustable and the second prong is fixed.

15. The restraining apparatus of claim 1, wherein the first prong is fixed and the second prong is adjustable.

16. A system for securing a vehicle onto a transport platform, the system comprising:
- a plurality of restraining mechanisms, each of the restraining mechanisms including an arm that extends in a first direction and is movable between a disengaged position and an engaged position, a first prong extending from the arm, a second prong extending from the arm, wherein the first prong and the second prong are configurable to secure a wheel of the vehicle onto the transport platform when the arm is in the engaged position, and wherein the first prong extends in the first direction from the arm and further extends in a second direction that is perpendicular to the first direction, and the second prong extends in a third direction that is perpendicular to both the first direction and the second direction.

17. The system of claim 16, wherein the transport platform is a trailer or a towing vehicle.

18. A restraining apparatus for securing a wheel of a vehicle onto a surface, the restraining apparatus comprising:
- an arm movable between a disengaged position and an engaged position, wherein the arm extends in a first direction;
- a first prong extending from the arm; and
- a second prong extending from the arm, wherein when the arm is in the engaged position, the first prong and the second prong secure the wheel on the surface, and wherein the first prong extends in the first direction from the arm and further extends in a second direction that is perpendicular to the first direction, and wherein the second prong extends in a third direction that is perpendicular to both the first direction and the second direction.

19. The restraining apparatus of claim 18 wherein the arm is movable between the disengaged position and the engaged position by rotating about an axis that is aligned with the first direction.

20. The restraining apparatus of claim 18 further comprising:
- an arm adjustment mechanism, the arm adjustment mechanism configured to move the arm between the disengaged position and the engaged position; and
- a prong adjustment mechanism, the prong adjustment mechanism configured to adjust at least one selected from a group including a position of the first prong and a position of the second prong.

* * * * *